United States Patent [19]

Ho

[11] Patent Number: 5,095,179

[45] Date of Patent: Mar. 10, 1992

[54] EXTENSIVE MORSE CODE PROCESSING SYSTEM

[76] Inventor: Lewis Ho, No. 27, Alley 20, Lane 61, Wu-Te St., Chung-Pu Hsiang, Taiwan

[21] Appl. No.: 558,576

[22] Filed: Jul. 26, 1990

[51] Int. Cl.$^5$ .................. H04L 3/04; H04L 15/00
[52] U.S. Cl. .................................................. 178/2 B
[58] Field of Search ........................ 178/2 B, 81, 80

[56] References Cited

U.S. PATENT DOCUMENTS 3,627,907 12/1971 Diggelmann et al. ............. 178/2 B

Primary Examiner—Stafford D. Schreyer
Attorney, Agent, or Firm—Ladas & Parry

[57] ABSTRACT

An extensive morse code processing system includes a microprocessor unit, a transmitter processing unit, a receiver processing unit, a display unit, a keyboard unit, and a radio unit. Whenever a data key on the keyboard is pressed, the ASCII code of the pressed key is received by the microprocessor unit and is converted into a binary line code. The line code is processed by the transmitter unit and is then transmitted as morse code signals by the radio unit. Morse code signals received by the radio unit are converted by the receiver unit into the corresponding binary line code. The line code from the receiver unit serves as input to the microprocessor unit which converts the line code into standard ASCII. The microprocessor then actuates the display unit to display the received characters. Exchange of data between the microprocessor unit and a a computer is also possible through an RS-232 interface adapter interconnecting the computer and the microprocessor unit.

28 Claims, 32 Drawing Sheets

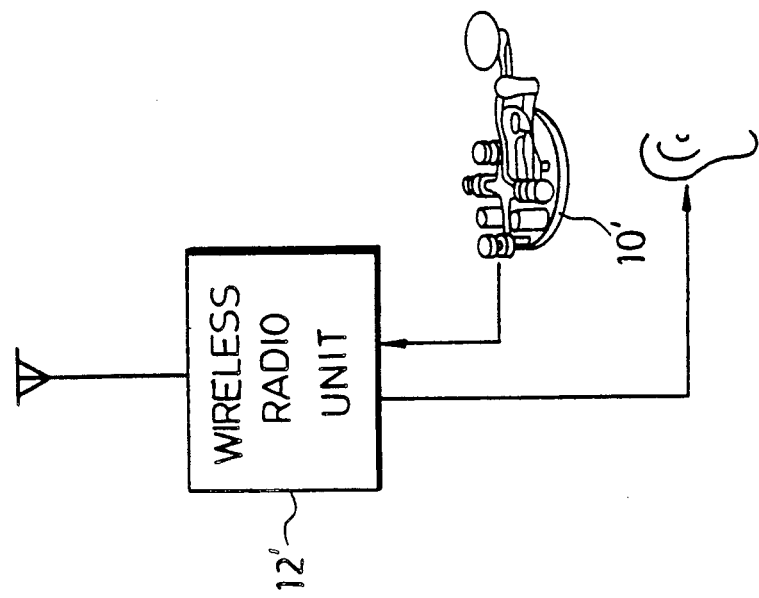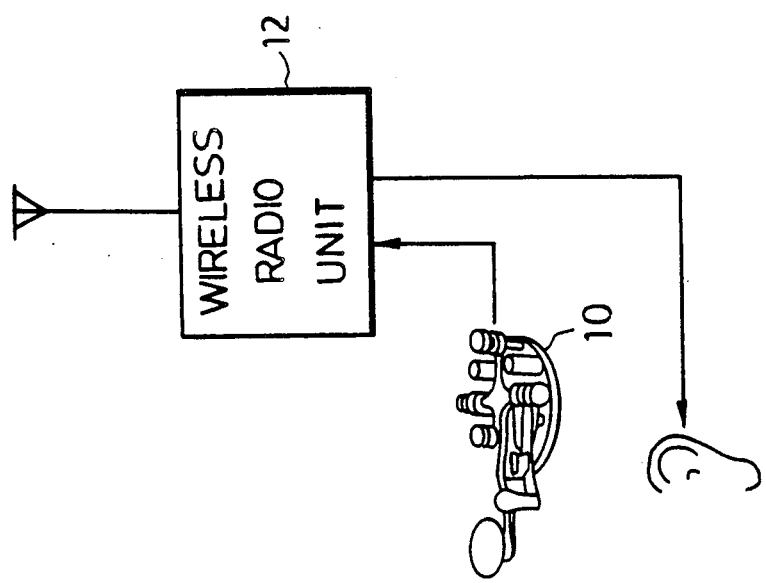
PRIOR ART
FIG. 1

EXTENSIVE MORSE CODE PROCESSING SYSTEM

BACKGROUND OF THE INVENTION

The invention relates generally to telegraphic systems, and more particularly, to an electronic apparatus and code converting method for the transmission and reception of morse code signals.

Morse code (see Table 1) is a widely used telegraph code which assigns a combination of short (dot) and long (dash) pulse signals to different characters. A block diagram of a conventional morse code telegraphic system is shown in FIG. 1. A telegraph key unit 10 is used to key in short and long pulse signals. The telegraph key unit 10 is connected to a wireless radio unit 12 which transmits the pulse signals to a remote radio unit 12'. The receiving party audibly distinguishes the received pulse signals and communicates with the sending party in a similar manner.

One of the main drawbacks of the above described morse core telegraphic system is that not everybody can operate such a system; only those whose are knowledgeable and skilled in coding and decoding morse code signals can be relied upon to accomplish such a task.

Another drawback of the conventional morse code system is that the rate of transmission/reception of the pulse signals cannot be increased without causing difficulties in discerning the pulse signals.

SUMMARY OF THE INVENTION

Therefore, a main object of this invention is to provide a morse code processing system which uses a standard computer keyboard instead of a telegraph key unit, thus making it easier to key in morse code signals.

Another object of this invention is to provide a morse code processing unit which has a display unit to show the characters which correspond to the received pulse signals, thus eliminating the need to audibly decode the morse code signals.

Still another object of this invention is to provide a morse code processing system which makes possible the transmission and reception of computer files.

Basically, the present invention provides a transmitter processing unit connected to a microprocessor. The microprocessor receives an ASCII coded character from either a computer keyboard or an RS-232 interface adapter of a personal computer. A look-up table for the conversion of ASCII characters to an extensive binary morse line code (EMC) is stored in a memory unit of the microprocessor. The transmitter processing unit converts the EMC equivalent of the character into a series of short and long pulse signals corresponding to the morse code representation of the character.

The EMC contains information on the number of pulse signals which represent the character in morse code and the order and length of each pulse signal. Thus, a short and a long pulse signal generator of the transmitter processing unit are actuated according to the EMC. A space generator inserts a length of space between two consecutive pulse signals so that the pulse signals can be easily distinguished from one another. The output of the transmitter processing unit is then directed to a wireless radio unit for eventual transmission to a remote receiver.

The present invention is also provided with a receiver processing unit similarly connected to the microprocessor. The receiver unit processes a series of short and long pulse signals received by the wireless radio unit and corresponding to the morse code representation of characters, and converts the series of pulse signals into the EMC. The EMC is received by the microprocessor which converts it into standard ASCII by means of an EMC to ASCII look-up table. The resulting ASCII code is then used to operate a display unit or sent to the personal computer through the RS-232 interface adapter.

BRIEF DESCRIPTION OF THE DRAWINGS

Other features and advantages of this invention will become apparent in the following detailed description of the preferred embodiment with reference to the accompanying drawings, in which:

FIG. 1 is an illustration of a conventional morse code telegraph system;

FIGS. 21 and 22 are flowcharts of receiver display unit service subroutines of the microprocessor unit;

Table 1 is a morse code table;

Table 2 is a list of characters found in a conventional keyboard with their corresponding morse, ASCII and binary line codes according to the present invention; and Table 3 is an extensive morse code to ASCII conversion table, arranged in order of increasing number of morse code signals present.

DETAILED DESCRIPTION OF THE PREFERRED EMBODIMENT

Figure 2:
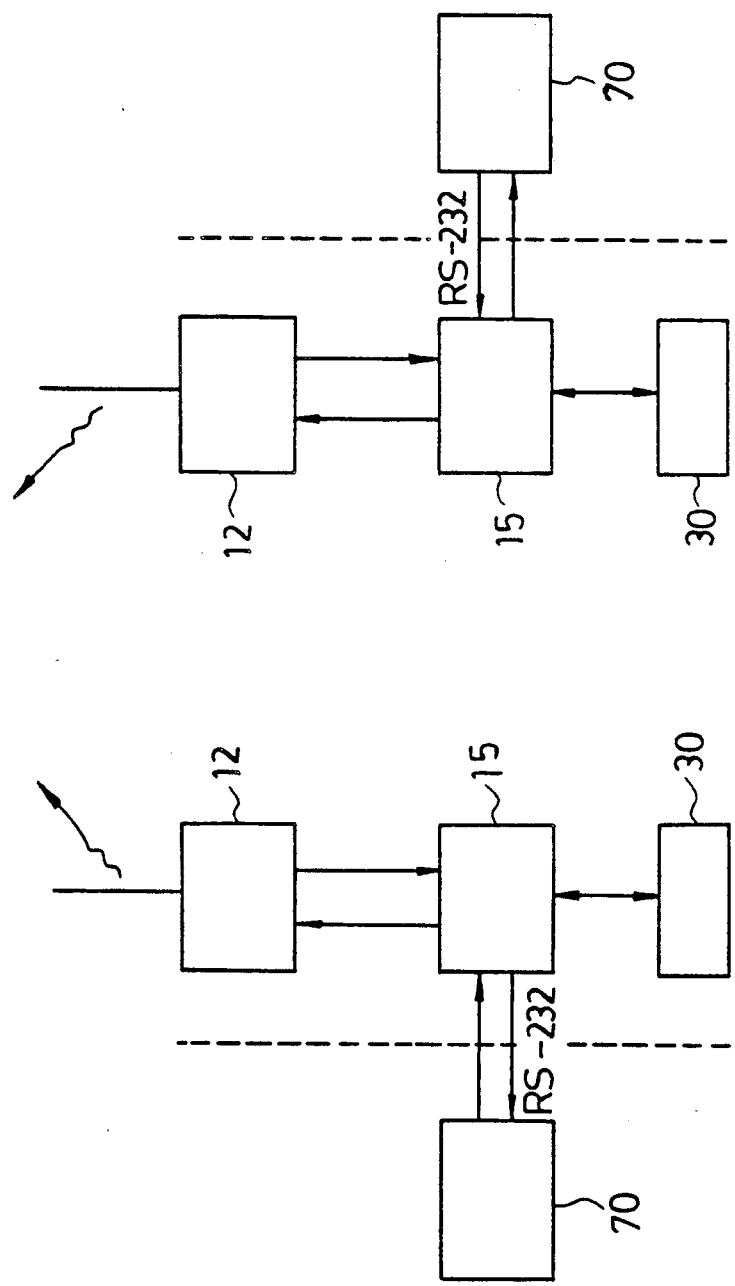
FIG. 2 is a simplified block diagram of the preferred embodiment and its intended environment.

A simplified block diagram of the preferred embodiment and its intended environment according to the present invention is shown in FIG. 2. A keyboard unit 30 or a computer 70 may be used to supply the characters to be transmitted by a wireless radio unit 12. The keyboard unit 30 and an RS-232 interface adapter of the computer 70 are connected to the extensive morse code processing system 15 of the present invention.

Figure 3:
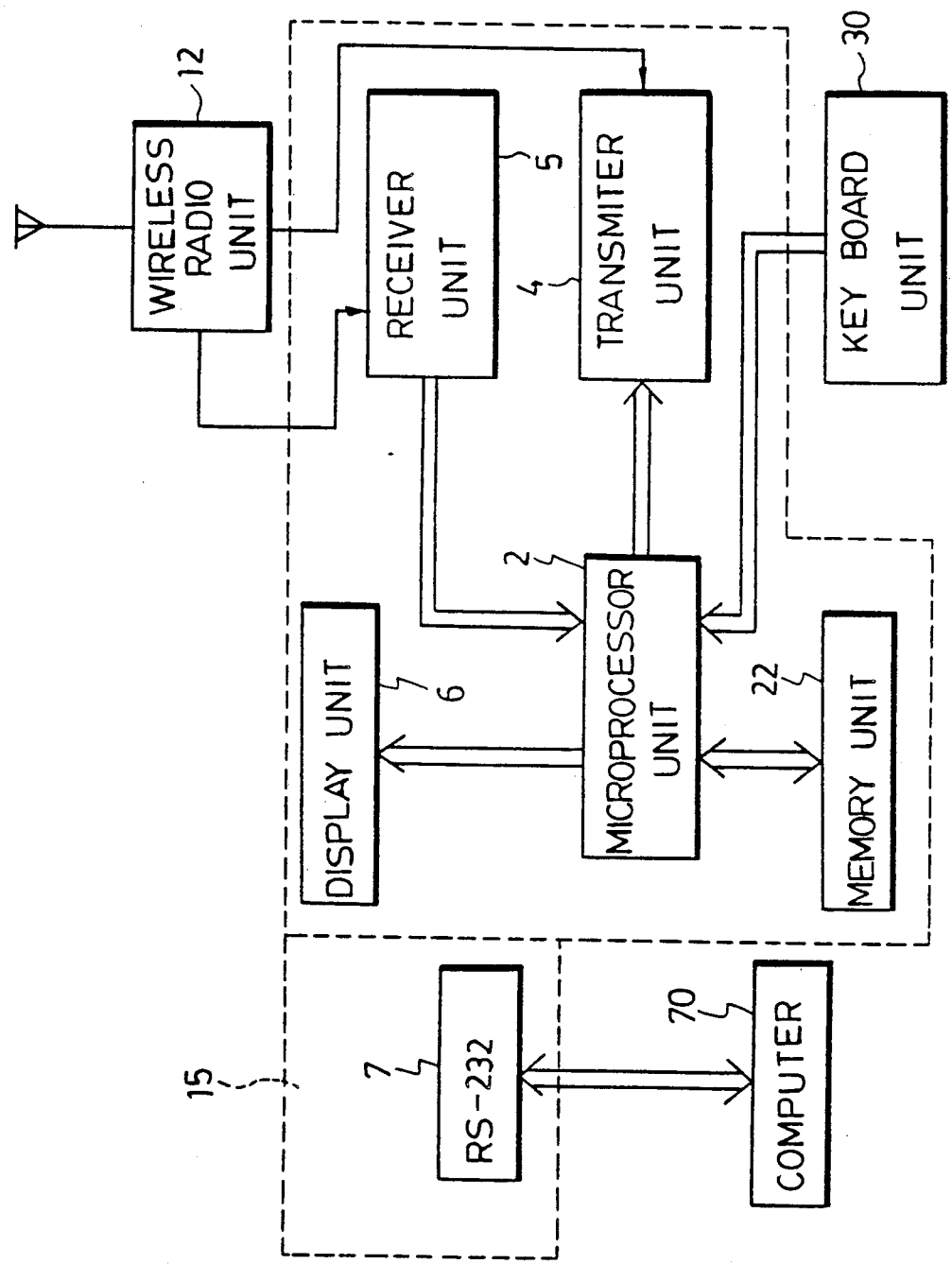
FIG. 3 is a more detailed block diagram which illustrates the preferred embodiment of this invention and its intended environment.

A more detailed block diagram of the preferred embodiment and its intended environment is shown in FIG. 3. The extensive morse code processing system 15 includes a microprocessor unit 2, a transmitter processing unit 4, a receiver processing unit 5 and a display unit 6. A keyboard unit 30 is connected to the microprocessor unit 2. Whenever a data key on the keyboard 30 is pressed, the ASCII code of the pressed key is received by the microprocessor unit 2 and is converted into a binary line code. The line code is processed by the transmitter unit 4 and is then transmitted as morse code signals by a radio unit 12. Morse code signals received by the radio unit 12 are converted by the receiver processing unit 5 into the corresponding binary line code. The line code from the receiver unit 5 serves as input to the microprocessor unit 2 which converts the line code into standard ASCII. The received characters can then be displayed on the display unit 6. Data can also come from and be sent to a computer 70 having an RS-232 interface adapter 7 connected to the microprocessor unit 2.

As described in the preceding paragraphs, before a character is sent to the wireless radio unit 12 for eventual transmission, the ASCII code of the character is first converted into an extensive binary morse line code (heretofore referred to as EMC). The first three most significant bits of the EMC signify the number of pulse signals which represent the character in conventional morse code. The remaining five bits describe the sequence and the length of each pulse signal. A zero (0) would indicate that the pulse signal is a short pulse signal (dot) while a one (1) would indicate that the signal is a long pulse signal (dash). In the disclosed embodiment, the order of the five remaining bits is reversed so that in the EMC, after the initial three bit length code, the next bit is the least significant bit of the representation of the conventional Morse Code.

The following are two examples which illustrate the above described conversion process:

EXAMPLE 1

The letter "T" is represented in conventional morse code by a single dash (—). Therefore, the first three most significant bits are 001, which indicate that the character is represented by only one pulse signal. As indicated above, the five remaining bits are taken least significant bit first. Also, if the Morse Code is shorter than five dots and dashes, the empty spaces after the More Code representation are filled with "Don't Care" bits which are at a zero logic level (0) in this embodiment of the conversion apparatus and process. Thus, the code (taken most significant bit first) for the letter "T" is 10000, representing a dash followed by four "Don't Care" bits. Of course, this "T" code becomes 00001 in least significant bit first notation. Thus, the EMC for the letter "T" is 00100001 or 21H.

EXAMPLE 2

The number "2" is represented in conventional morse code by two dots and three dashes (. . - - - ). Therefore, the first three most significant bits should be 101, which indicate that the character comprises of five pulse signals. The succeeding five bits are 11100 in least significant bit first notation, which bits denote that the first two pulse signals are dots and the next three pulse signals are dashes. Thus, the EMC for the number "2" is 10111100 or BCH.

A slightly different conversion process is employed if the morse code representation of the character comprises six pulse signals. In this case, the first two bits of the EMC are "11" followed by a six bit representation of the Morse Code, again taken lest significant bit first. For example, the Morse Code for a period is dot dash dot dash dot dash (. - . - . - ). The EMC for a period is 1110101.

Table 2 its the characters found in a standard computer keyboard 30 with their corresponding morse, ASCII and EMC codes. The characters marked with an asterisk (*) are not represented by any combination of pulse signals in conventional morse code.

In the receiver processing unit 5 of the preferred embodiment, a received short pulse signals or dot is represented by a logic zero (0) while a received long pulse signal or dash is represented by a logic one (1). The length of a dot signal is set at one unit, while the length of a dash signal is set at three units. The detection of more than 2.5 units of space signifies that reception of a character has been completed. An up counter is used to determine the number of signals received.

The following is an example illustrating the general operation of the morse code to EMC conversion process:

EXAMPLE 1

The letter "G" is received in conventional morse code as two dashes and a dot (- - .). The first three most significant bits are 011, which indicate that the character is represented by three signals. The next two bits are considered as "Don't Care" bits. The succeeding three bits are 110, which indicate that the received signals comprise two dashes followed by a dot. Thus, the received letter "G" is represented by 01100110=66H. The reader will note that, in the case of the receiving apparatus, the three bits corresponding to the two dashes and dot of the letter code are taken most significant bit first, unlike the case with the transmitting apparatus. Of course, the receiving apparatus and the transmitting apparatus, even if they are used to transmit and receive a message, they do so using Morse Code, and therefore there is no particular need that the EMC codes used within the transmitting apparatus and receiving apparatus be identically the same codes.

Table 3 is an extensive morse code to ASCII conversion table. The characters are arranged according to the number of pulse signals present.

Figure 4:
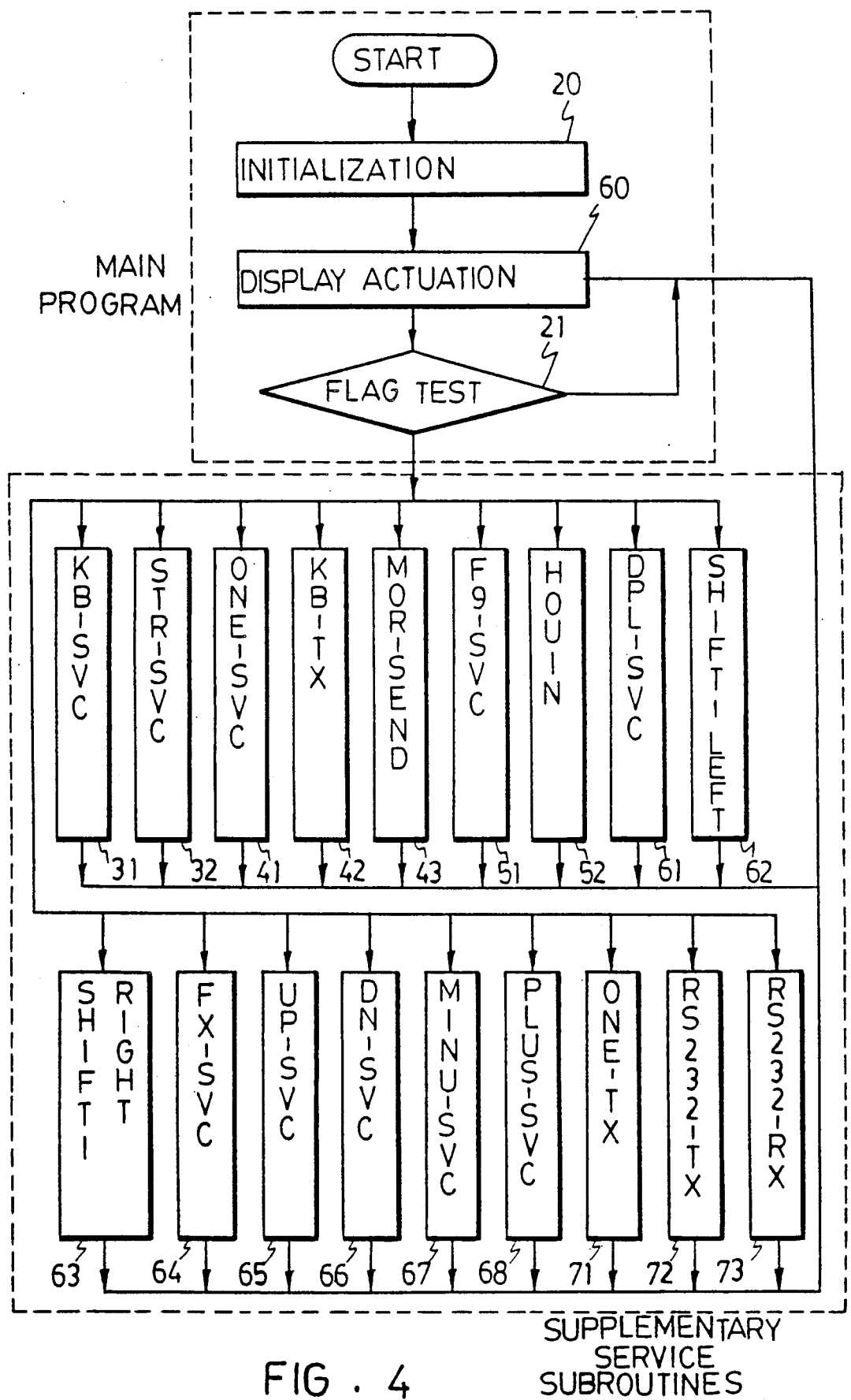
FIG. 4 is a main flowchart showing the accompanying software for a microprocessor unit of the preferred embodiment.

FIG. 4 is a flow chart showing the operation of the microprocessor unit 2 of the preferred embodiment.

The IC chip of the microprocessor unit 2 is IC 8751. The specifications of IC chips can be readily obtained from electronic data books, and thus, the IC chips used will not be detailed herein.

The software built into the microprocessor unit 2 comprises a main program and a plurality of supplementary services subroutines. The main program includes an initialization stage 20, a display actuation stage 60, and a flag testing routine 21.

The supplementary services subroutines include the following:
1. A keyboard interrupt service 31 (KB-SVC)
2. A keyboard input data storage service 32 (STR-SVC)
3. A keyboard data code transmission service 41 (ONE-SVC)
4. A keyboard data string transmission service 42 (KB-TX)
5. A memory data transmission service 43 (MOR-SEND)
6. An Extensive Morse Code (EMC) transmission/reception speed adjustment service 51 (F9-SVC)
7. An EMC transmission/reception interrupt service 52 (HOUIN)
8. A dot matrix display service 61 (DPL-SVC)
9. A left-shift display service 62 (SHIFT-LEFT)
10. A right-shift display service 63 (SHIFT-RIGHT)
11. A function key service 64 (FX-SVC)
12. A first receiver display service 65 (UP-SVC)
13. A second receiver display service 66 (DN-SVC)
14. A third receiver display service 67 (MINU-SVC)
15. A fourth receiver display service 68 (PLUS-SVC)
16. An RS-232 character transmit service 71 (ONE-TX)
17. An RS-232 string transmittal service 72 (RS232-TX)
18. An RS-232 character/string reception service 73 (RS232-RX)

The RS-232 character transmit service 71, the RS-232 string transmit service 72, and the RS-232 character/string receive service 73 are provided to allow transmission and reception of ASCII codes with the use of a personal computer. Each service subroutine will be discussed in greater detail in the succeeding paragraphs.

Figure 5A:
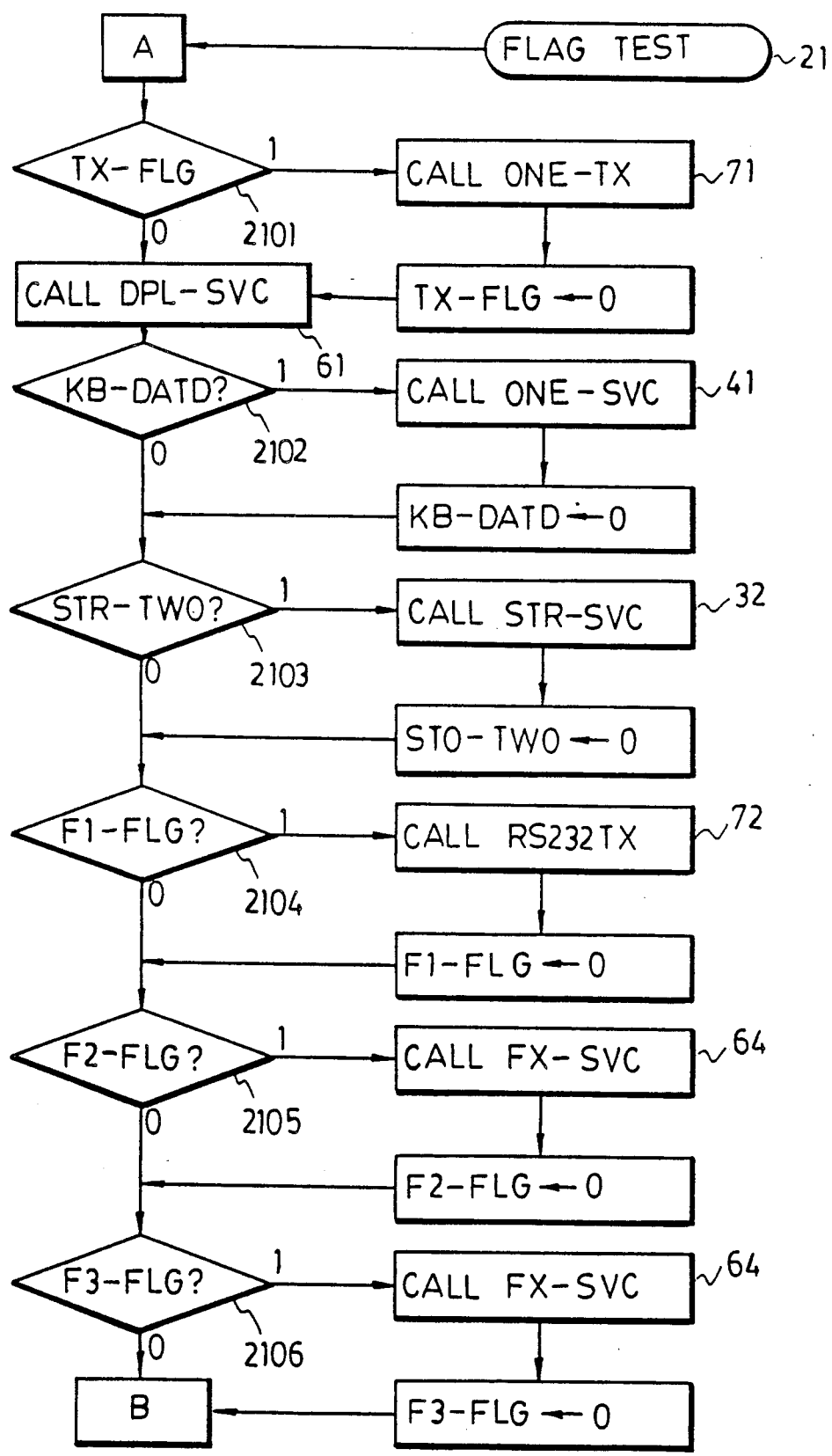
FIGS. 5A, 5B, and 5C are flowcharts of a flag testing routine of the microprocessor unit of the preferred embodiment.
Figure 5B:
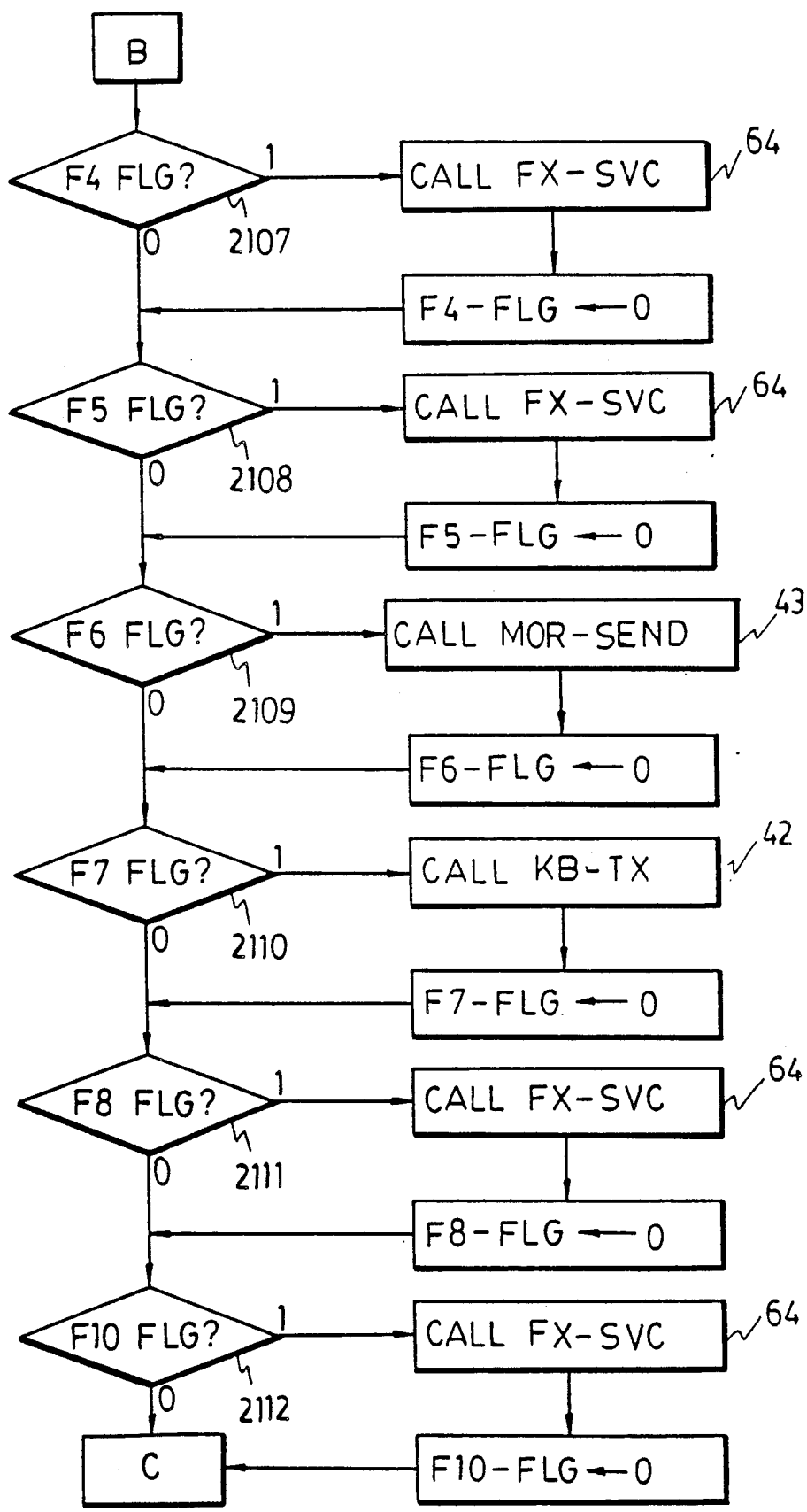

A flowchart of the flag testing routine 21 is shown in FIGS. 5A, 5B and %c. The following flags are to be tested:
1. Transmitter flag 2101 (TX-FLG)
2. Keyboard data flag 2102 (KB-DATA)
3. Keyboard data storage flag 2103 (STR-TWO)
4. F1 function key flag 2104 (F1-FLG)
5. F2 function key flag 2105 (F2-FLG)
6. F3 function key flag 2106 (F3-FLG)
7. F4 function key flag 2107 (F4-FLG)
8. F5 function key flag 2108 (F5-FLG)
9. F6 function key flag 2109 (F6-FLG)
10. F7 function key flag 2110 (F7-FLG)
11. F8 function key flag 2111 (F8-FLG)
12. F10 function key flag 2112 (F10-FLG)
13. ENTER key fag 2113 (ETR-FLG)
14. Display flag 2114 (MINU-FLG)
15. Display flag 2115 (PLUS-FLG)
16. Display flag 2116 (UP-FLG)
17. Display flag 2117 (DN-FLG)
18. Backspace key flag 2118 (BS-FLG)

During the operation of the flag testing routine 21, if the content of the flag being tested is a logic zero (0), no supplementary services subroutine would be initiated, and the next flag would be tested. If the content of the flag being tested is a one (1), a corresponding subroutine would be executed.

It TX-FLG 2101 =1, the supplementary services subroutine ONE-TX 71 would be executed. This informs the microprocessor unit 2 that a data byte is to be transmitted to the computer 70 through the RS-232 interface adapter 7.

If KE-DATA 2102 =1, the supplementary services subroutine ONE-SVC 41 would be executed. This is used to send a data code from the keyboard 30 to the transmitter processing unit 4.

If STR-TWO 2103 =1, the supplementary services subroutine STR-SVC 32 would be executed. This means that data from the keyboard 30 is to be stored in the memory unit 22.

If F1-FLG 2104 =1, the supplementary services subroutine RS232-TX 72 would be executed. This signifies that data stored in the memory unit 22 will be sent to the computer 70 through the RS-232 interface adapter 7.

If F2-FLG 2105 =1, the supplementary services subroutine FX-SVC 64 would be executed and the character string "H001-SOS" would be sent by the wireless radio unit 12.

If F3-FLG 2106 =1, the supplementary services subroutine FX-SVC 64 would be executed and the character string "REPEAT" would be sent by the wireless radio unit 12.

If F4-FLG 2107 =1, the supplementary services subroutine FX-SVC 64 would also be executed and a preset character string (such as "HXXX") would be sent by the wireless radio unit 12.

If F5-FLG 2108 =1, the supplementary services subroutine FX-SVC 64 would be executed and a second pre-set character string (such as "HXXX") would be sent by the wireless radio unit 12.

If F6-FLG 2109 =1, the supplementary services subroutine MOR-SEND 43 would be executed. This means that data from the computer 70 is to be sent to the wireless radio unit 12.

If F7-FLG 2110 =1, the supplementary services subroutine KG-TX 42 would be executed. This initiates the transmission of a string from the keyboard 30.

If F8-FLG 2111 =1, the supplementary services subroutine FX-SVC 64 would be executed and the character string "RECEIVED" would be sent out by the wireless radio unit 12.

If F10-FLG 2112 =1, the supplementary services subroutine FX-SVC 64 would be executed and the character string "TX-ERROR" would be sent out by the wireless radio unit 12.

If ETR-FLG 2113 =1, the supplementary services subroutine KB-TX 42 would be executed. The resulting operation is substantially similar to the operation when F7-FLG 2110 =1.

If MINU-FLG 2114 =1, the supplementary service subroutine MIN-SVC 67 would be executed. The display pointer at the receiver side moves backward by 1 unit.

If PLUS-FLG 2115 =1, the supplementary service subroutine PLUS-SVC 68 would be executed. The display pointer at the receiver side moves forward by 1 unit.

If UP-FLG 2116 =1, the supplementary service subroutine UP-SVC 65 would be executed. The display pointer at the receiver side moves to the starting address of the receiver buffer.

If DN-FLG 2117 =1, the supplementary service subroutine DN-SVC 66 would be executed. The display pointer at the receiver side moves to the end point of the receiver buffer.

If BS-FLG 2118 =1, the supplementary service subroutine FX-SVC.64 is executed. The transmitted signal is similar to a reset signal. The string "RX-HOME" is displayed at the receiver side.

Figure 5C:
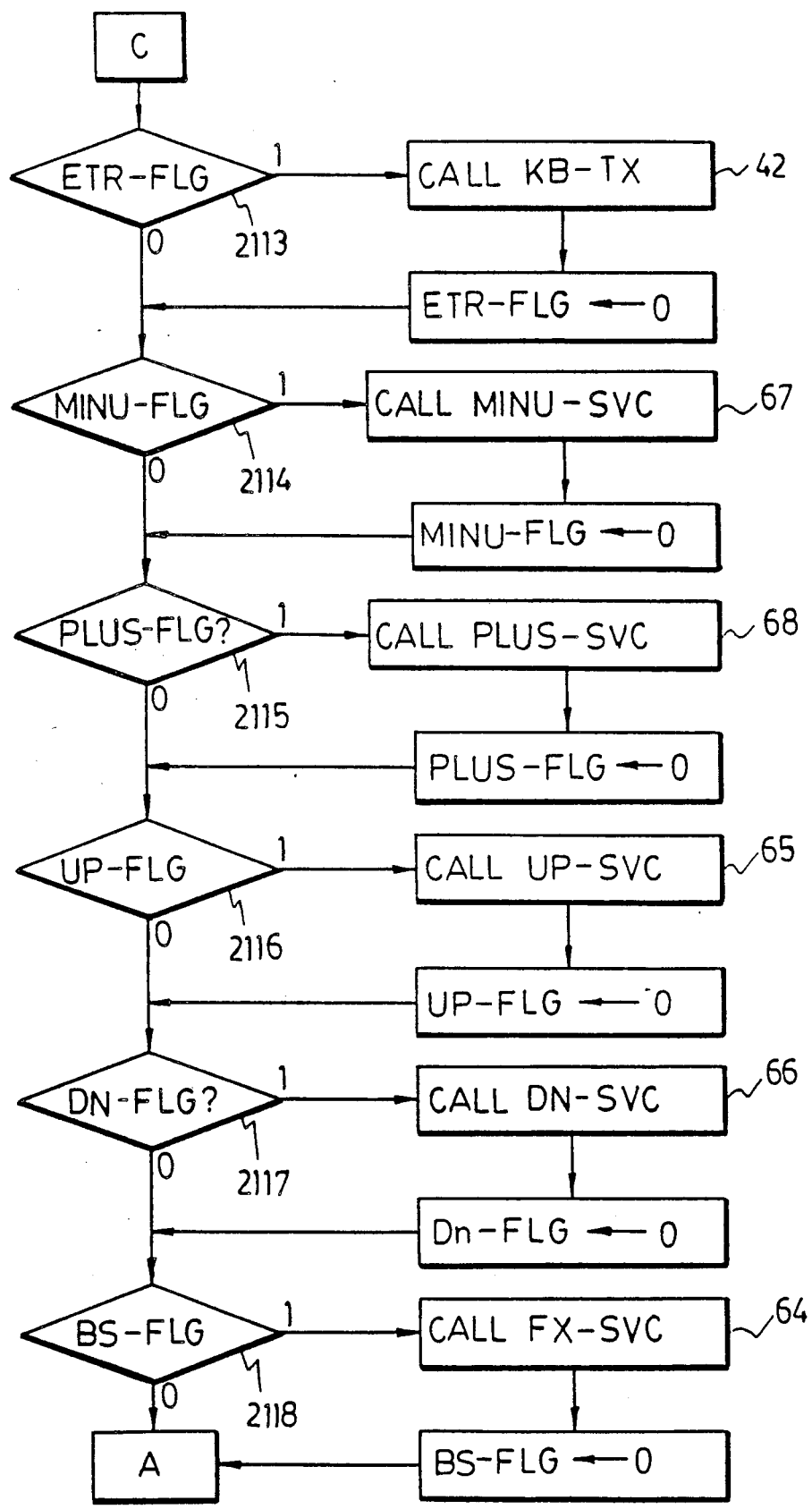

As shown in FIGS. 5A, 5B and 5C, after execution of the services subroutine has been completed, the corresponding flag is reset to zero (0) and the succeeding flags are tested. After the final flag (BS-FLG 2118) has been examined, the flag testing routine 21 once more tests the state of the first flag (TX-FLG 2101).

Once a key on the keyboard 30 is pressed, an interrupt signal is received by IC 8751 and the ASCII equivalent of the pressed key is received at a keyboard port P1 (pins P1.0 to P1.7) f the microprocessor unit 2. (Refer to FIG. 6). Once the ASCII code has been received, IC 8751 classifies the pressed key as a data key or a function key.

Figure 6:
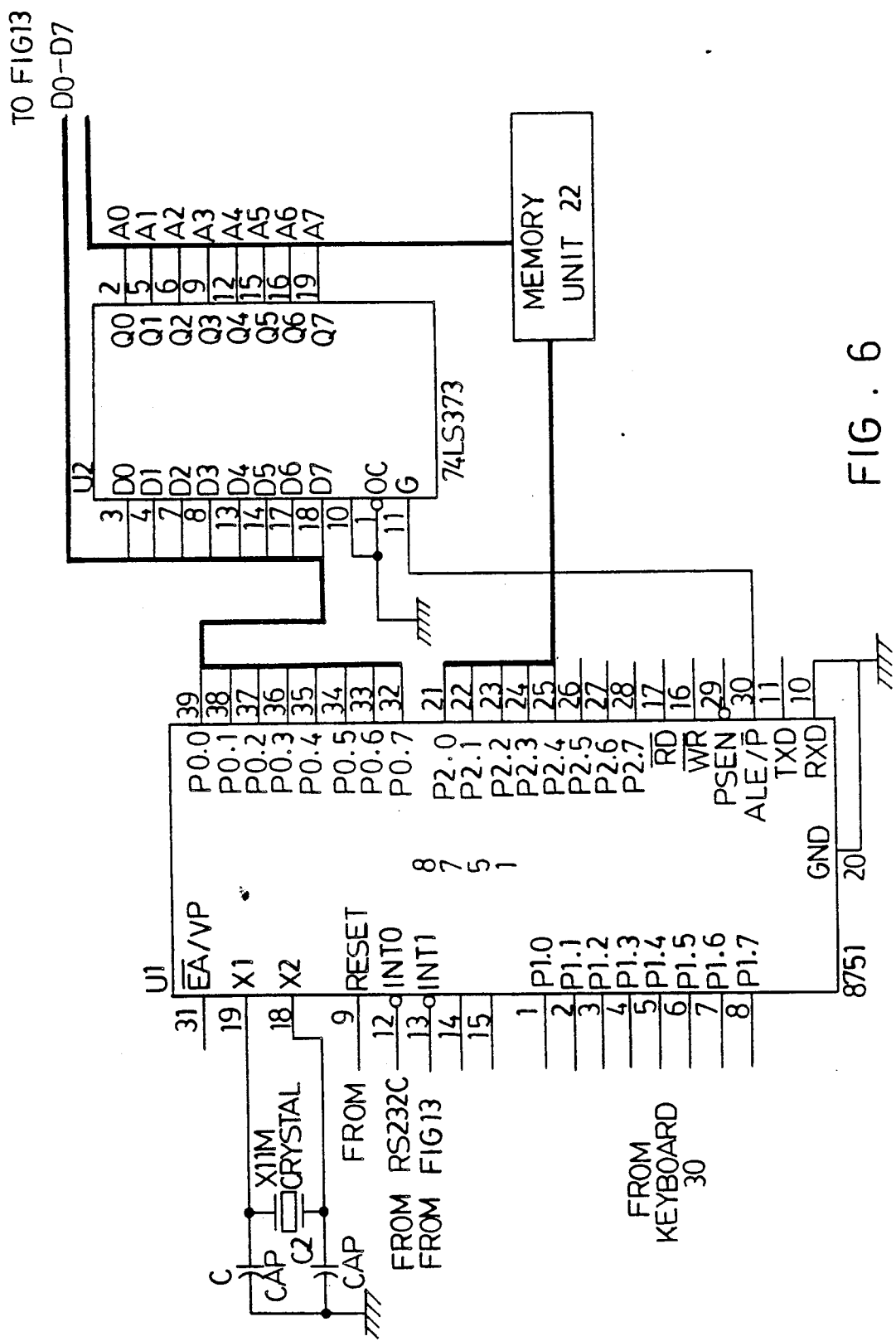
FIG. 6 is a schematic circuit diagram of the microprocessor unit of the present invention.

FIG. 6 is a flowchart of the KB-SVC 31 subroutine. KB-SVC 31 is a keyboard interrupt service subroutine which consists of three parts:

1) RS232 interrupt testing routine. Whenever the RS-232 interface adapter 7 is used to transmit or receive data, KB-SVC 31 generates an interrupt signal which is received by the $\overline{\text{INTO}}$ pin of IC 8751. (Refer to FIG. 6).

2) Function key testing routine. The function keys involved are the following:
   F1: Received data is sent to the computer 70 through the RS-232 interface adapter 7.
   F2: Used to transmit a distress signal (such as "H001-SOS").
   F3: Used to transmit a "REPEAT" string as a request for retransmission.
   F4: Used to transmit a pre-set string which acts as a user code. (such as "HXXX"; XXX can represent any number from 000 to 999).
   F5: Used to transmit a pre-set ID code "ID ?????".
   F6: Used when data from the computer 70 is to be sent to the wireless radio unit 12.
   F7: Used to repeat the transmission of data input from the keyboard buffer. The ESC key is used to signal the end of the transmission.
   F8: Used to send out the string "RECEIVED" indicating that data has been successfully received.
   F9: There are two possible speeds of transmission; pressing the F9 key selects the slower rate. This facilitates deciphering of the audible signals received. The speed at this point is similar to the speed of transmission when using the conventional telegraph key unit. The ESC key is pressed to select the normal speed of transmission. Manual/auditory decoding of signals received at the normal speed is relatively difficult because of the faster rate of transmission.
   F10: Used to send out the string "TX-ERROR" to inform the transmitting party that data sent was not properly received.
   CTRL: Used to set a CTL-FLG which indicates the start of keying of a string.
   PgUp: Used to move the display pointer to the starting point of the receiver buffer.
   PgDn: Used to move the display pointer to the end point of the receiver buffer.
   −: Moves the display pointer backward by 1 unit.
   +: Moves the display point forward by 1.
   BS: Used to display the string "RX-HOME" at the receiver side. If a wrong key was pressed at the transmitter side during transmission, the BS key may be pressed to replace the preceding character with new data.

3) Input data testing routine. Data may be a character or a string. If the data is character, it is immediately processed and sent to the wireless radio unit 12. If the data is a string, each character is temporarily stored in the keyboard buffer until the F7 key or the RETURN key is pressed. Only then is the stored string processed and sent to the wireless radio unit 12.

Figure 7:
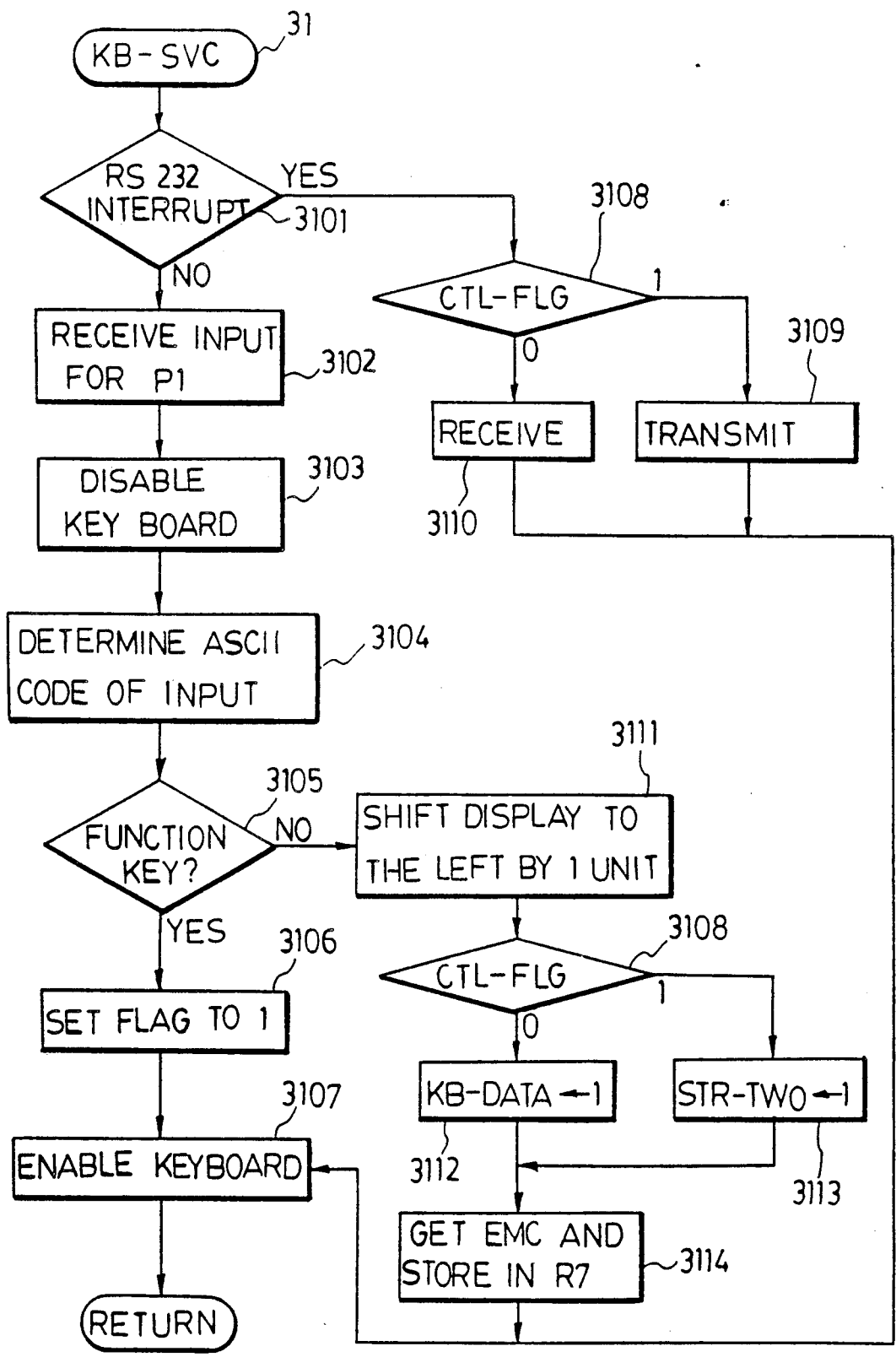
FIG. 7 is a flowchart of a keyboard interrupt service subroutine of the microprocessor unit.

Referring again to FIG. 7, the KB-SVC 31 subroutine is executed whenever a key on the keyboard 30 is pressed. KB-SVC 31 first tests for the presence of an RS232 interrupt 3101. If not RS232 interrupt 3101 is present, an instruction 3102 to receive a keyboard input for the keyboard port P1 is done. The keyboard 30 is then disabled (instruction 3103). The corresponding ASCII code of the keyboard input is then determined (instruction 3104). The resulting ASCII code is then tested to find out whether or not the keyboard input is a function key (instruction 3105). If the keyboard input is a function key, the flag corresponding to the function key is set to one (1) (instruction 3106). The keyboard 30 is once more enabled (instruction 3107) and the KB-SVC 31 subroutine returns to the main program.

If the keyboard input is a data key, the characters found on the display unit 6 are shifted one character space to the left (instruction 3111). The control flag CTL-FLG is then tested to check if keying of the character has started (instruction 3108). If CTL-FLG =0, the KB-DATA 2102 flag is set to one (1) (instruction 3112). If CTL-FLG =1, the STR-TWO flag 2103 is set to one (1) (instruction 3113). After the KB-DATA flag 2102 or the STR-TWO 2103 flag has been set and the corresponding EMC has been obtained, the resulting EMC is stored in the register R7 of IC 8751 (instruction 3114). The keyboard 30 is once more enabled (instruction 3107) and the KB-SVC 31 subroutine returns to the main program.

If there is an RS232 interrupt, the control flag CTL-FLG is tested (instruction 3108). If CTL-FLG =1, a transmitting instruction 3109 is executed. Otherwise, a receiving instruction 3110 is executed. After execution of either of the two instructions 3109 and 3110, the keyboard 30 is once more enabled (instruction 3107) and the KB-SVC 31 subroutine returns to the main program.

Figure 8:
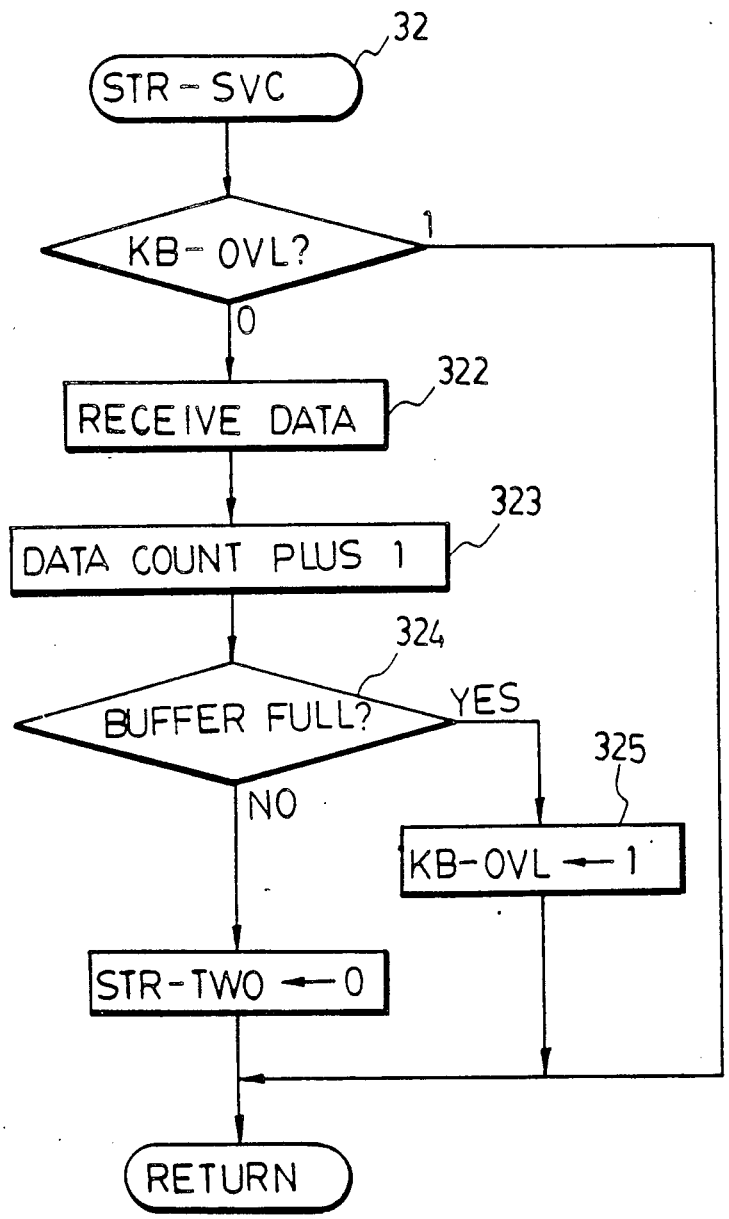
FIG. 8 is a flowchart of a keyboard data storage subroutine of the microprocessor unit.

FIG. 8 is a flowchart of the STR-SVC 32 subroutine. STR-SVC 32 is executed whenever the STR-TWO flag 2103 =1. The routine 32 first tests whether or not KB-OVL =1 (instruction 321). KB-OVL is a control parameter which is set whenever the keyboard buffer of the keyboard 30 is full. If STR-SVC 32 is executed when KB-OVL =1, the subroutine 32 would return to the main program. If STR-SVC 32 is executed when KB-OVL =0, data is received by the keyboard buffer (instruction 322) and the character count of the keyboard buffer is incremented by one (instruction 323). The keyboard buffer is then tested to determine if it is full or not (instruction 324). If the keyboard buffer is full, KB-OVL is set to one (1) (instruction 325) and the STR-SVC 32 subroutine returns to the main program. If the keyboard buffer can still receive data, the STR- TWO flag 2103 is set to zero (0) (instruction 326) and the STR-SVC 32 subroutine returns to the main program. Once the RETURN key is pressed, the string stored in the keyboard buffer is transmitted by the wireless radio unit 12.

Figure 9:
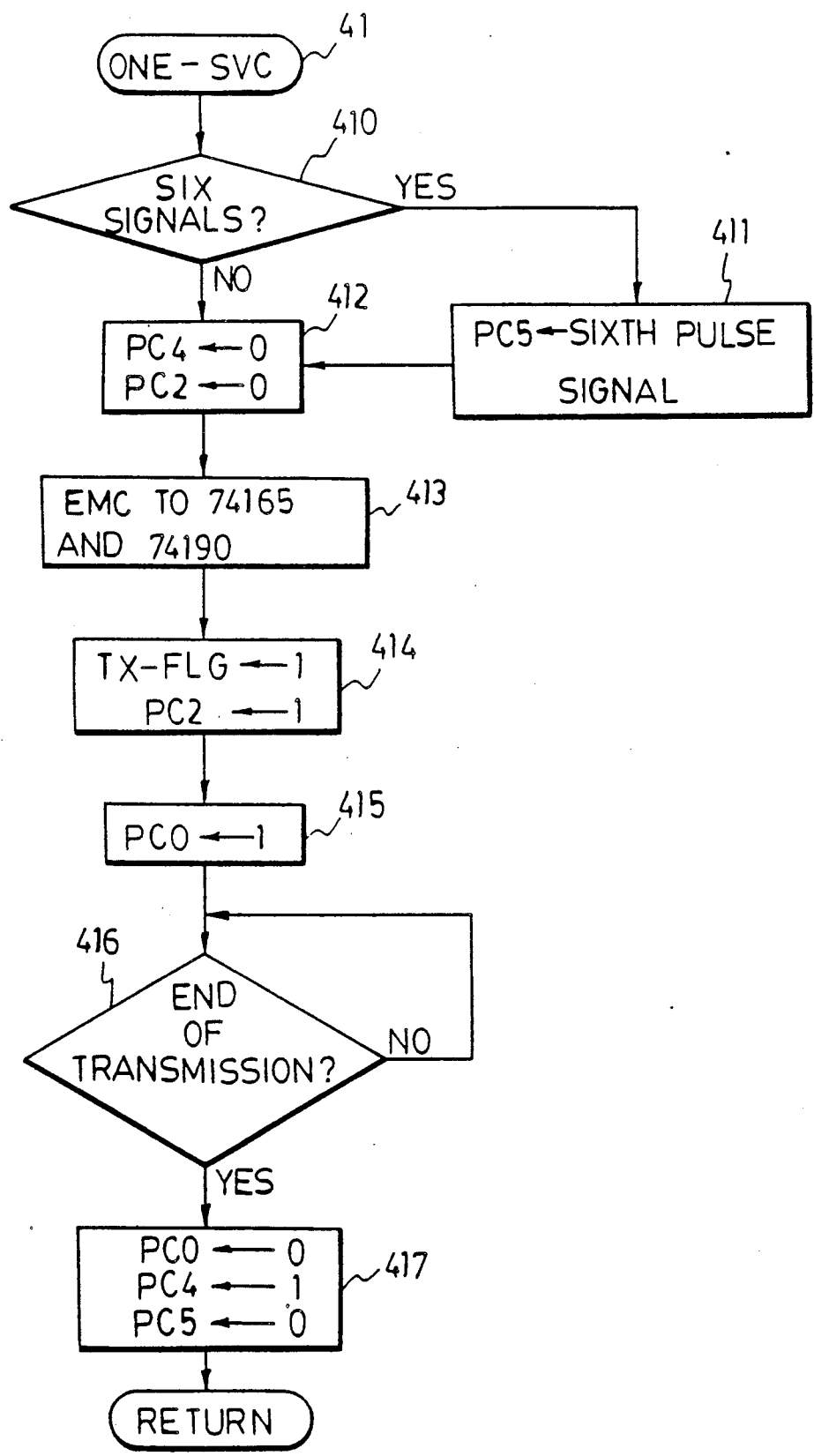
FIG. 9 is a flowchart of a keyboard data code transmission subroutine of the microprocessor unit.

FIG. 9 is a flowchart of the ONE-SVC 41 service subroutine. When executed, ONE-SVC 41 first tests if the morse code of the character to be transmitted comprises six pulse signals (instruction 410). If the morse code of the character has less than six pulse signals, PC4 and PC2 are set to zero (0) (instruction 412). PC4 =0 means that the receiver processing unit 5 is disabled. PC2 =0 means that the IC 74165 is in a load mode. (Refer to FIGS. 13). An additional step, setting PC5 to correspond to the sixth signal, is executed if the morse code of the character is in fact comprised of six signals (instruction 411). After setting PC4 and PC2, the EMC equivalent of the character is written to ICs 74165 and 74190 (instruction 413). TX-FLG 2101 and PC2 are set to one (1) (instruction 414), and PC0 is set to one (1) (instruction 415) to signal the start of transmission. PC2 =1 configures IC 74165 in a shift mode. An instruction 416 which tests whether transmission has ended is then continuously executed. At the end of transmission, PC0 and PC5 are set to zero (0) and PC4 is set to (1) (instruction 417). The ONE-SVC 41 subroutine returns to the main program.

Figure 10A:
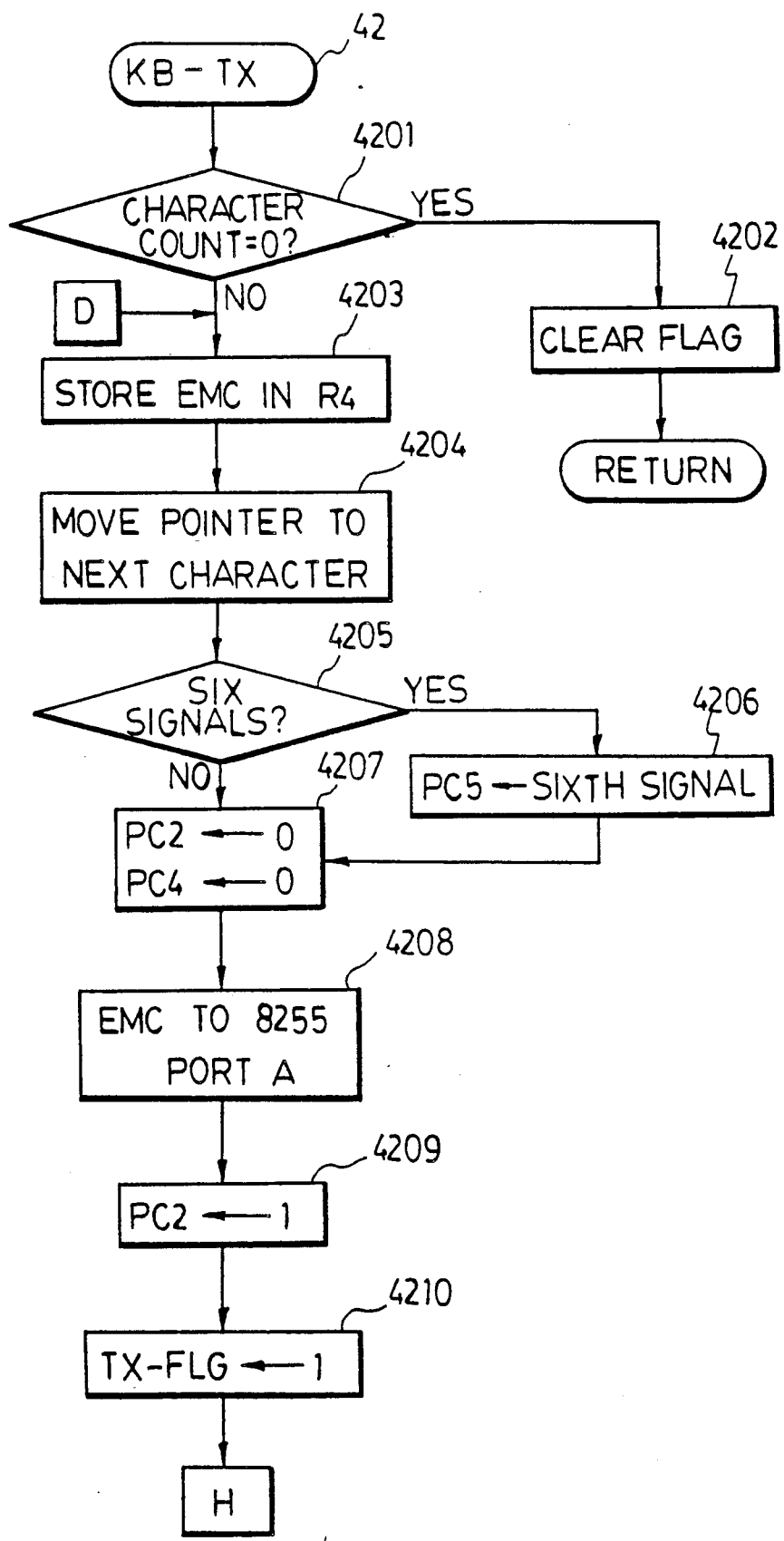
FIGS. 10A and 10B are flowcharts of a keyboard data string transmission subroutine of the microprocessor unit.
Figure 10B:
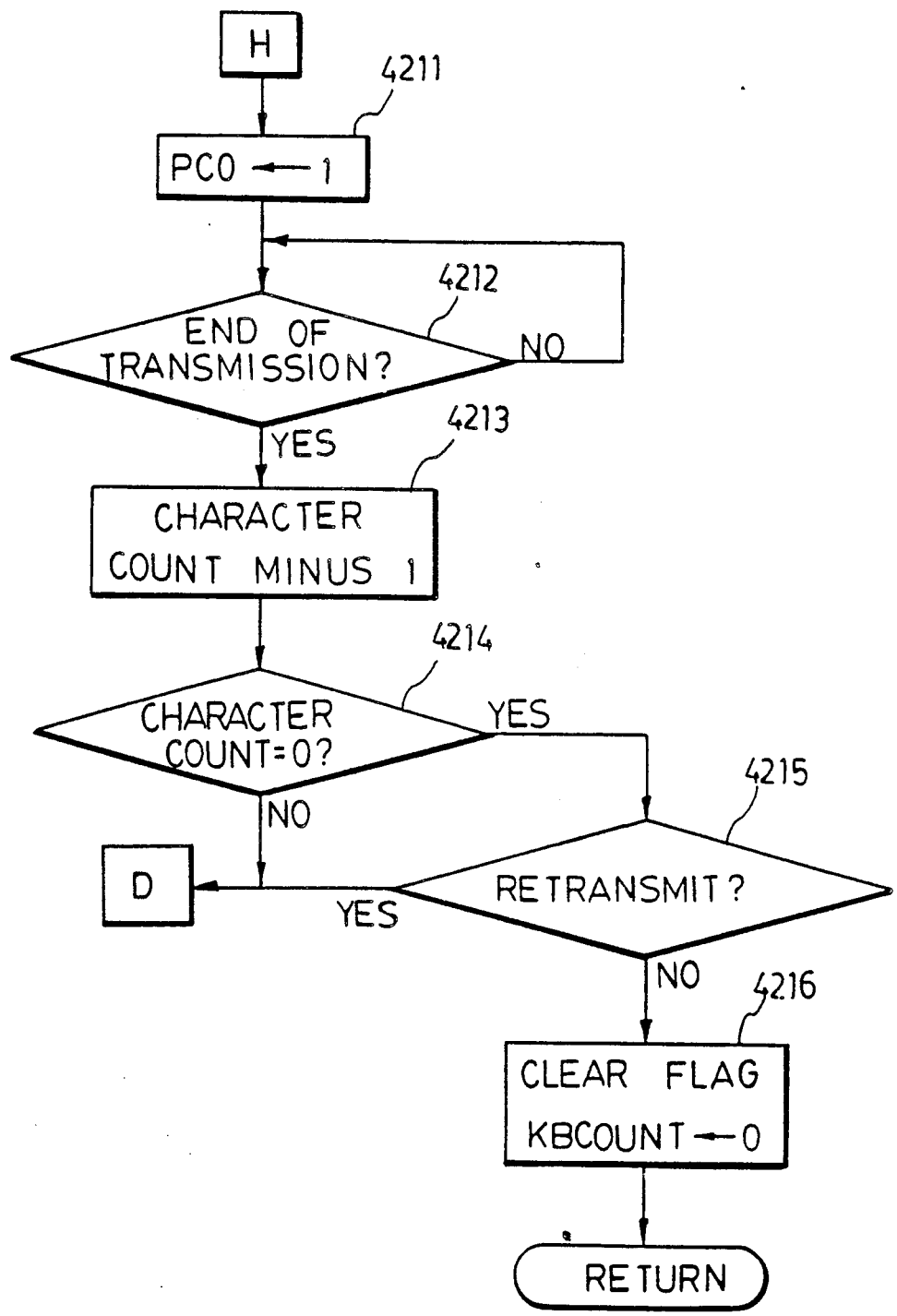

FIGS. 10A and 10B are flowcharts of the KB-TX 42 service subroutine. Once executed, KB-TX 42 first tests if the character count of the keyboard buffer is equal to zero (0) (instruction 4201). If the character count is equal to zero, the F7-FLG 2107 or ETR-FLG 2113 is cleared (instruction 4202) and the KB-TX 42 subroutine returns to the main program. Otherwise, the EMC of the character is stored in the register R4 of IC 8751 (instruction 4203) and a pointer is moved to the next character to be transmitted (instruction 4204). The subroutine 42 then tests if the morse code of the character to be transmitted is comprised of six pulse signals (instruction 4205). If there are less than six pulse signals, PC4 and PC2 are set to zero (0) (instruction 4207). The step of setting PC5 to 1 is added if there are six pulse signals and the sixth pulse signal is a long pulse signal (instruction 4206). After setting PC4 and PC2, the EMC of the character is written to PORT A of IC 8255 (instruction 4208). (Refer to the circuit diagram of FIG. 13). PC2 is set to one (1) (instruction 4209), the TX-FLG 2101 is set to one (1) (instruction 4210), and PC0 is set to one (1) (instruction 4211) to signal the start of transmission. An instruction 4212 to continuously monitor the end of transmission is then executed. At the end of transmission of the character, the character count is decreased by one unit (instruction 4213). The character count is then tested to determine whether or not it is equal to the zero (instruction 4212). If the character count is equal to zero, the subroutine 42 tests whether or not transmission is to be repeated (instruction 4215). If transmission is not to be repeated, the F7-FLG 2110 or ETR-FLG 2113 is cleared and the keyboards character count (KB-COUNT) is set to zero (0) (instruction 4216). The KB-TX 42 subroutine then returns to the main program.

Figure 11A:
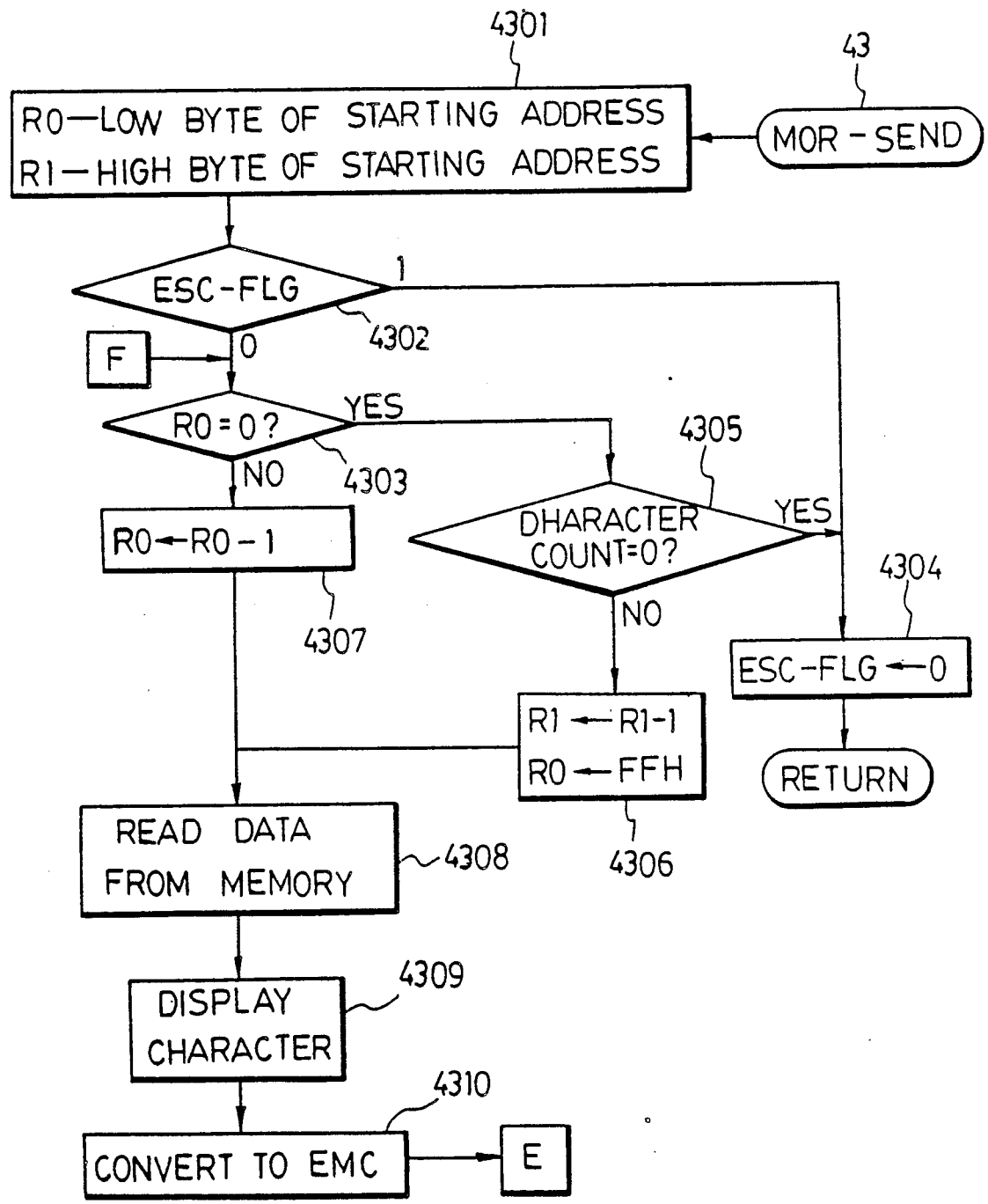
FIGS. 11A and 11B are flowcharts of a memory data transmission subroutine of the microprocessor unit.
Figure 11B:
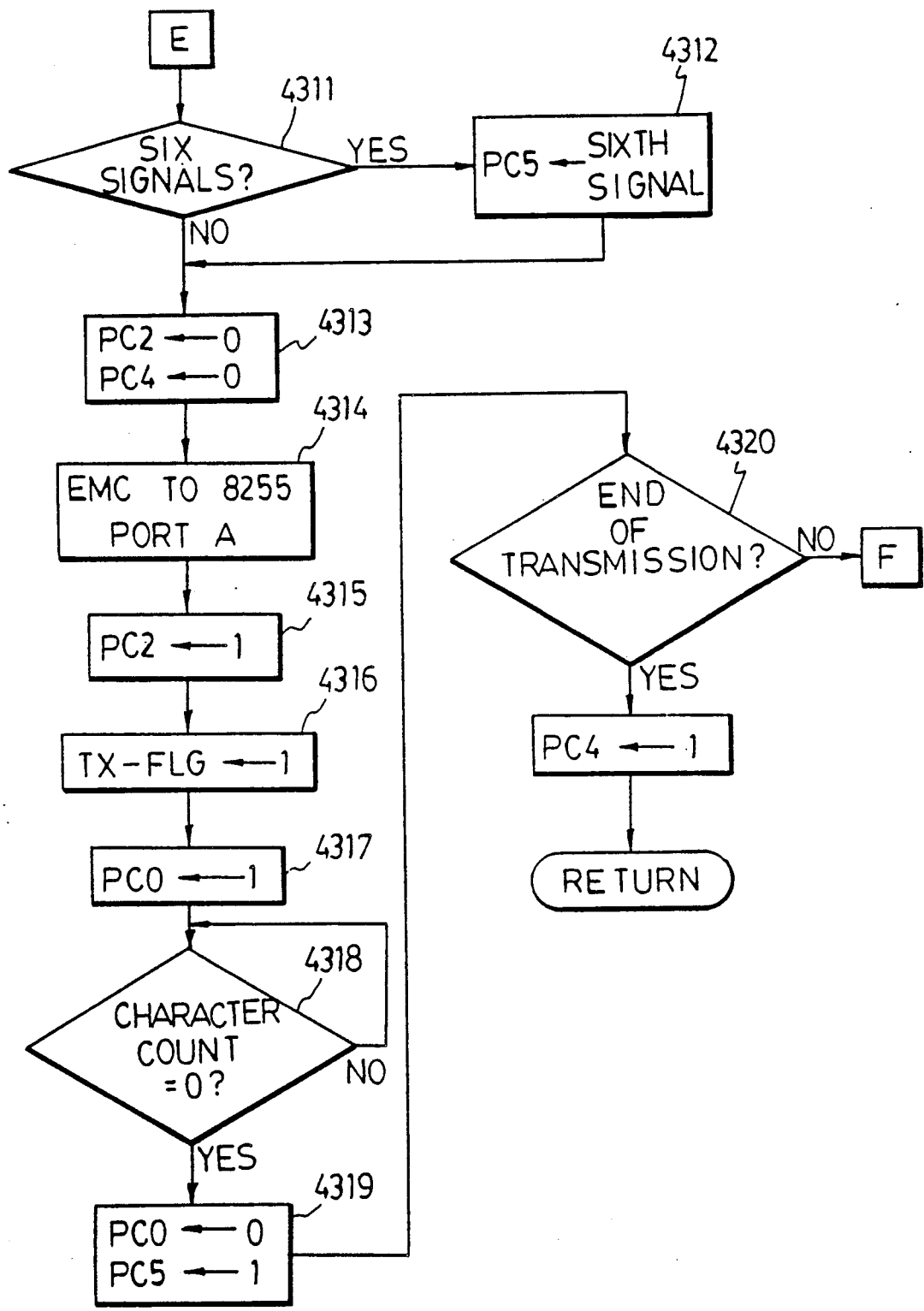

FIGS. 11A and 11B are flowcharts of the MOR-SEND 43 service subroutine. The objective of the MOR-SEND 43 subroutine is to send data from the memory unit 22 to the wireless radio unit 12. When F6-FLG 2109 =1, the low byte of a particular starting address of the memory unit 22 is stored in the register R0 of IC 8751 and the high byte of the starting address is stored in the register R1 of IC 8751 (instruction 4301). The logic state of the ESC-FLG is then tested (instruction 4302). If ESC-FLG =1, the ESC-FLG is reset to zero (0) (instruction 4304) and the subroutine 43 returns to main program. If ESC-FLG =0, the content of R0 is then tested to see whether it is equal to zero (instruction 4303). If the content of R0 is equal to zero, the character count of the memory unit 22 is then tested to find if it is equal to zero (0) instruction 4305). If the character count is equal to zero, the ESC-FLG flag is reset to zero (0) (instruction 4304) and the subroutine 43 returns to the main program. If the character count is not equal to zero, the contents of register R1 is decreased by one and the contents of register R0 is replaced by FFH (instruction 4306). If the content of register R0 is not equal to zero, the content of register R0 is decreased by one (1) (instruction 4307). The first character to be transmitted is then read from the memory unit 22 (instruction 4308), displayed on the display unit 6 (instruction 4309), and converted into its corresponding EMC (instruction 4310). The number of morse code signals of the character is then tested to see if it is equal to six (instruction 4311). If the number of morse code signals is less than six, PC4 and PC2 are set to zero (0) (instruction 4313). The step of setting RC5 to correspond to the sixth morse code signal is added if the number of signals is equal to six (instruction 4312). After setting PC4 and PC2, the EMC equivalent of the character is written to PORT A of IC 8255 (instruction 4314), and PC2 is set to one (1) to enable ICs 74165 and 74190 (instruction 4315). TX-FLG 2101 is then set to one (1) (instruction 4316), and PC0 is set to one (1) (instruction 4317) to signal the start of transmission. The character count is then repeatedly tested until it becomes zero (instruction 4318). If the character count becomes zero, PC0 and PC5 are set to zero (0) (instruction 4319). An instruction 4320 is then executed to determine if the transmission has ended. At the end of transmission, PC4 is set to one (1) to enable the receiver processing unit 5 (instruction 4321). The MOR-SEND 43 subroutine returns to the main program. If the character count is not zero, instruction 4303 is once more performed and another transmitting cycle is executed.

Figure 13A:
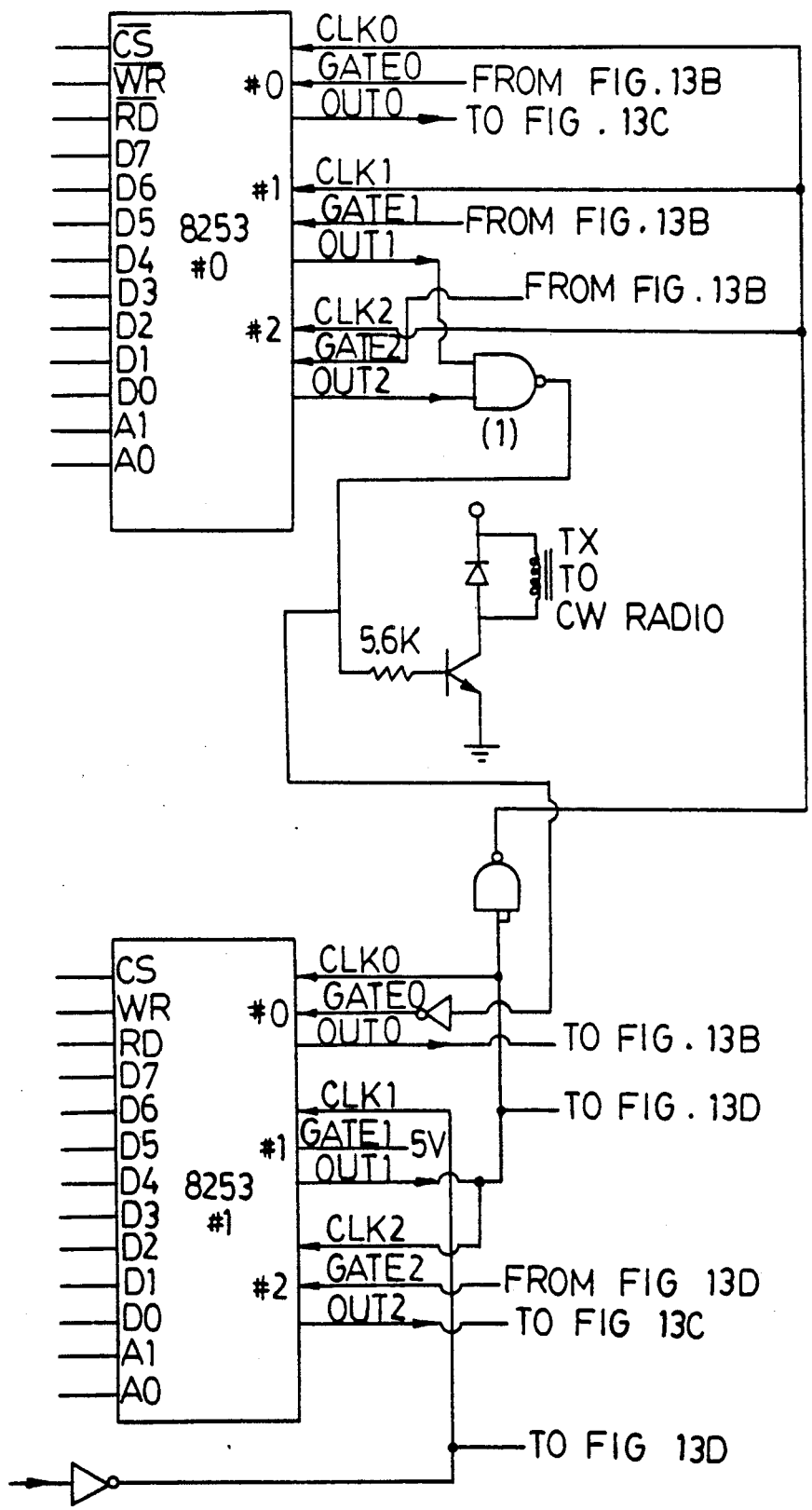
FIGS. 13A, 13B, 13C, and 13D are schematic circuit diagrams illustrating the transmitter processing unit and a receiver processing unit of the preferred embodiment.
Figure 13B:
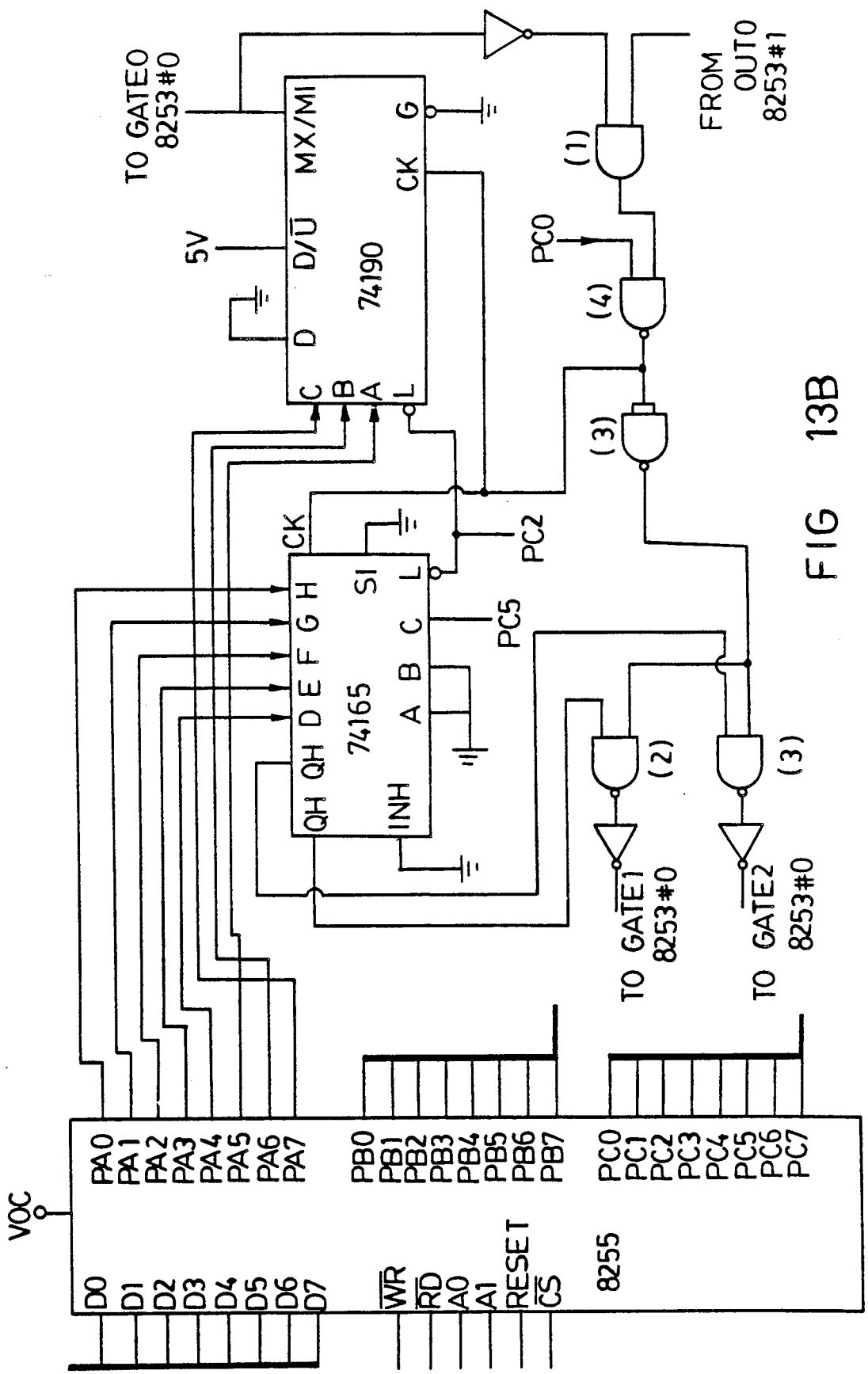
Figure 13C:
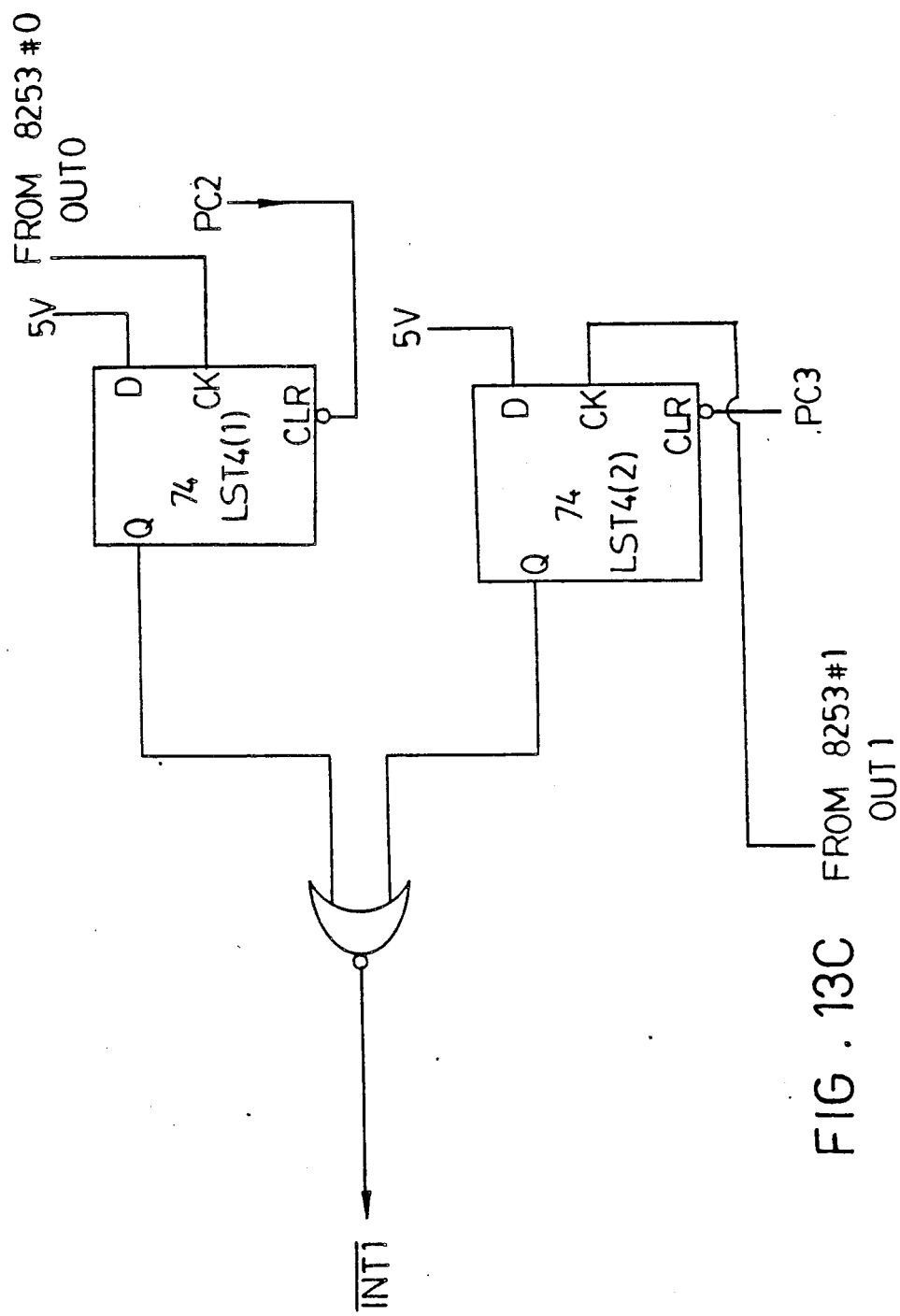
Figure 13D:
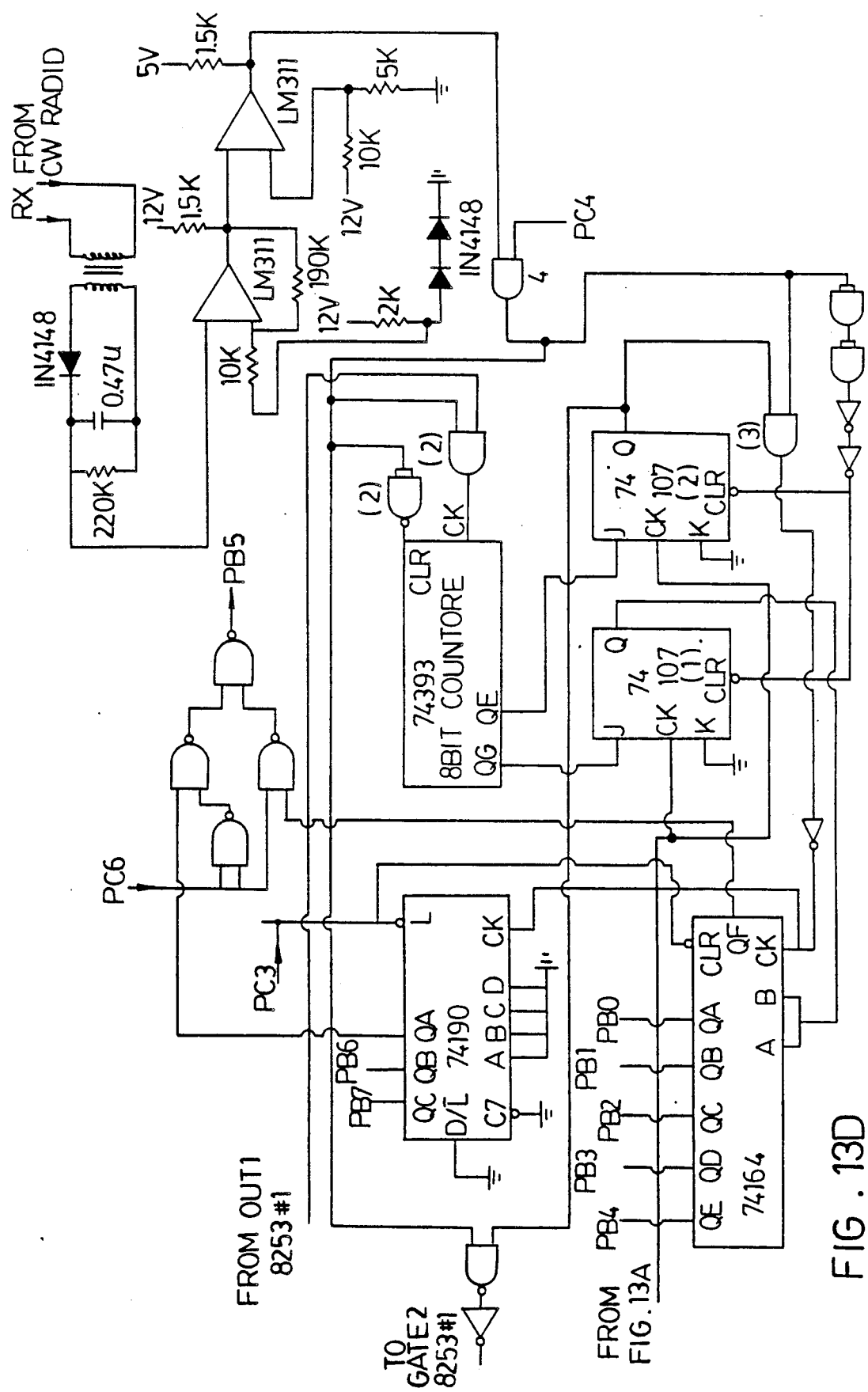

Once the EMC of the character has been obtained, the resulting code serves as an input to the transmitter processing unit 4 shown in FIGS. 13A, 13B and 13C.

Figure 12:
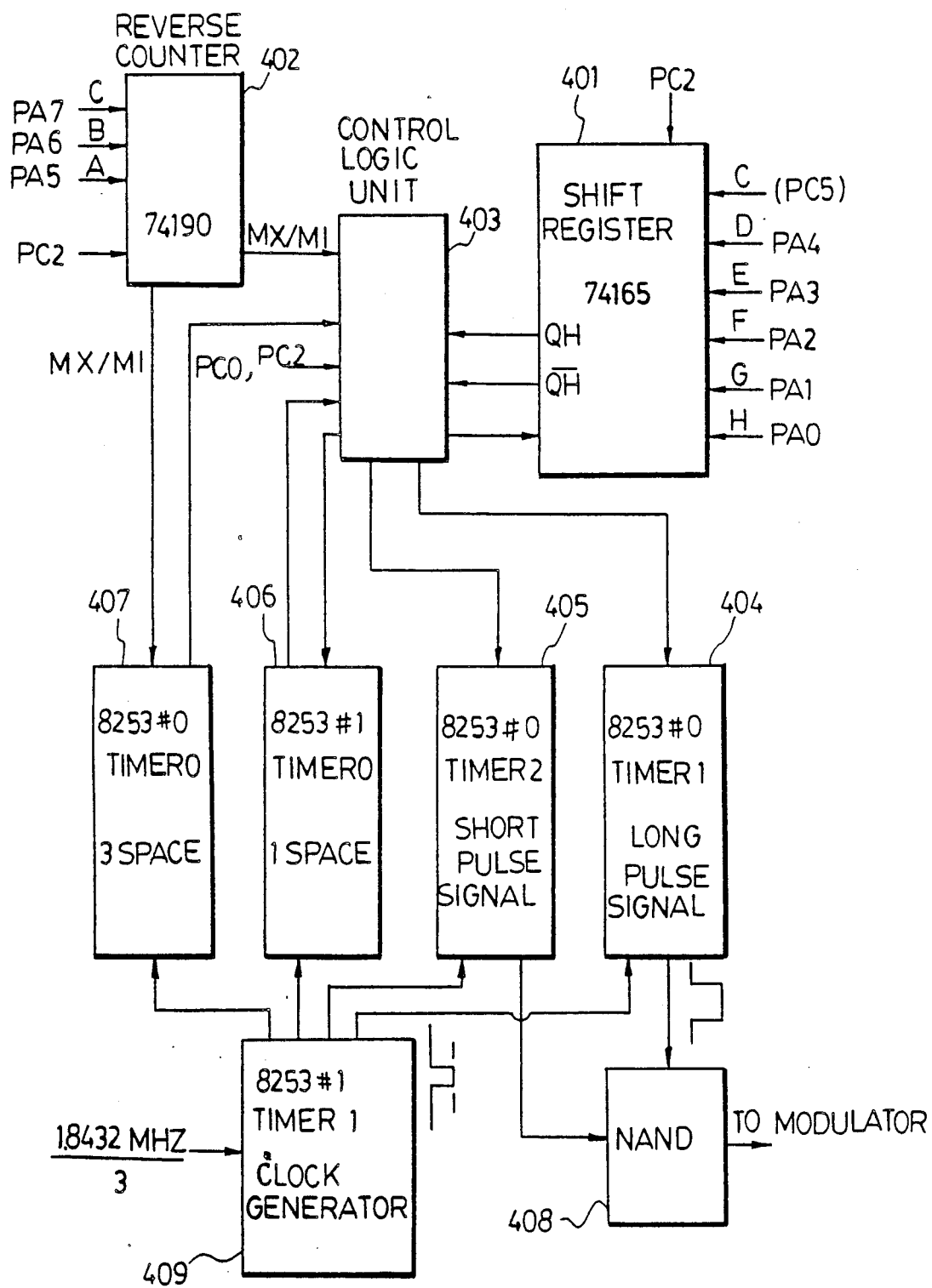
FIG. 12 is a circuit block diagram of a transmitter processing unit of the preferred embodiment.

Referring to the block diagram of the transmitter processing unit 4 of FIG. 12 in combination with the schematic circuit diagrams of FIGS. 13A, 13B and 13C, when PC2 undergoes a one (1) to zero (0) change, bits PA7 PA6 and PA5 of the EMC serve as inputs to a down counter 402 (IC 74190). The bits PC5 PA4 PA3 PA2 PA1 PA0 serve as input to a shift register 401 (IC 74165). A zero (0) to one (1) change in PC2 serves as a trigger signal for both the shift register 401 and the down counter 402. The control logic 403 begins to operate when PC0 changes from zero (0) to one (1). This signifies the start of transmission of a character. The control logic 403 regulates the operation of a long pulse signal generator 404 (OUT1 or IC 8253 #0), a short pulse signal generator 405 (OUT2 of IC 8253 #0), a one unit space generator 406 (OUT0 of IC 8253 #1), and a three unit space generator 407 (OUT0 of IC 8253 #0). A clock generator 409 (OUT1 of IC 8253 #1) provides a clock pulse to the generators 404, 405, 406 and 407. The outputs of the long pulse signal generator 404 and the short pulse signal generator 405 are directed to a NAND gate 408. The output of NAND gate 408 is modulated for eventual transmission by the wireless radio unit 12.

Figure 14:
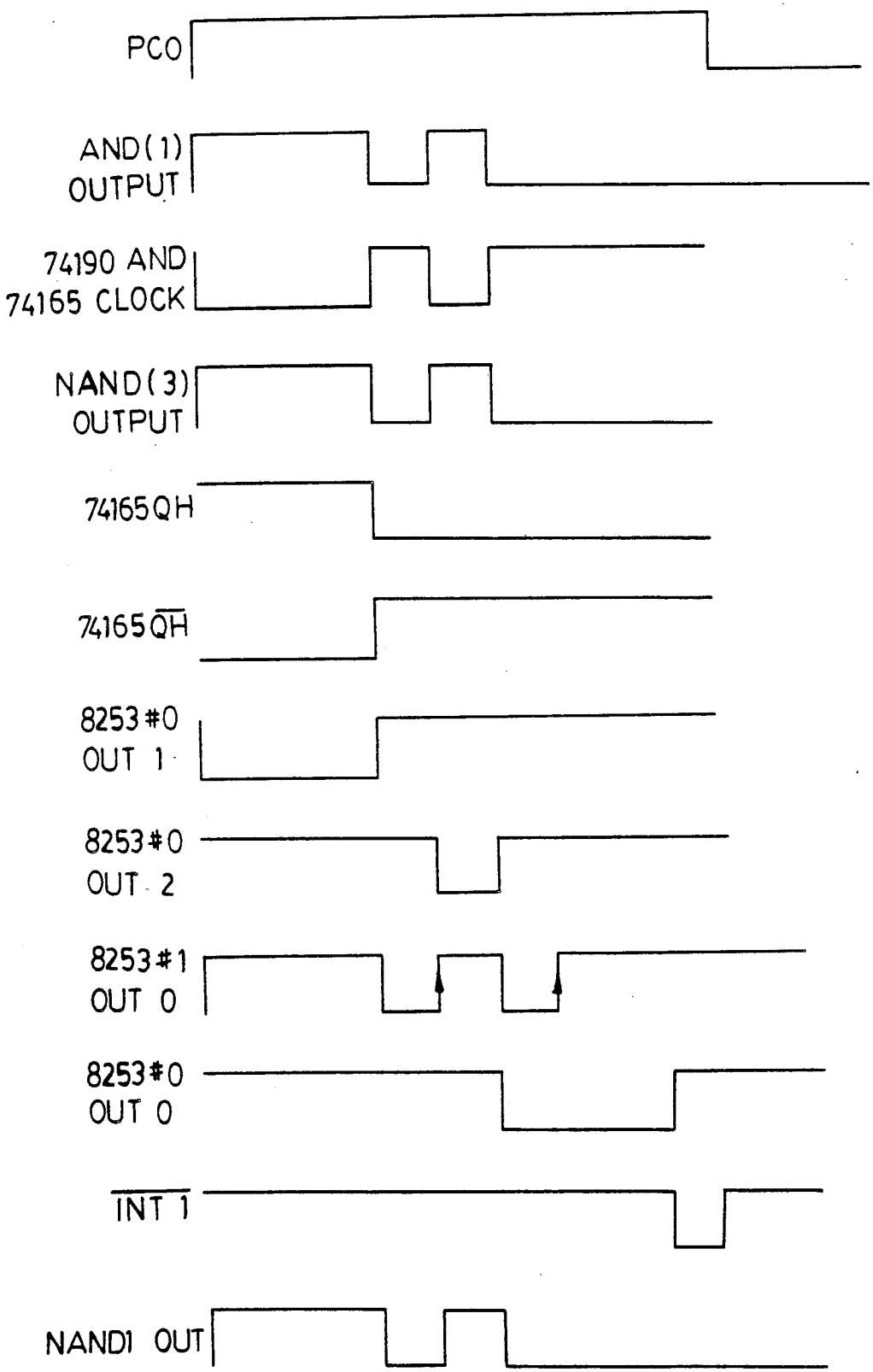
FIG. 14 is a timing diagram illustrating the operation of the transmitter processing unit.

Referring to FIGS. 13A, 13B, and 13C and to the timing diagram of FIG. 14, the operation of the transmitter processing unit 4 of this invention is as follows:

(1) PC0 : (Bit 0, Port C of IC 8255 #0)

During the start of the transmission of the EMC of a character, PC0 changes from zero (0) to one (1). After transmission of the EMC has been achieved, PC0 changes from one (1) to zero (0).

(2) Output of NAND (4)

The output of NAND (4) serves as a cock input to the ICs 74165 and 74190. A transition of the output of NAND (4) from zero (0) to one (1) will correspondingly shift the data in IC 74165 by one unit to the right and decrease the contents of IC 74190 by one unit. When the contents of IC 74190 reaches 0000H, the MX/MI pin changes from zero (0) to one (1). Timer 0 of IC 8253 #0 is actuated when MX/MI =1. The OUT0 pin of IC 8253 #0 is connected to the clock of IC 7474 (1). When the OUT0 pin of IC 8253 #0 changes from zero (0) to one (1), the transition is detected by IC 7474 (1). The Q pin of IC 7474 (1) changes from zero (0) to one (1), and $\overline{INT1}$ goes low. This informs IC 8751 that transmission of the EMC has been completed.

(3) Output of NAND (3)

The output of NAND (3) is the inverse of the output of NAND (4). A zero (0) to one (1) transition at the output of NAND (3) indicates the start of a long or a short pulse signal. If the QH pin of IC 74165 =1, Timer 1 of IC 8253 #0 is actuated. The resulting signal is a long pulse signal having a time period of three units. If the $\overline{QH}$ pin of IC 74165 =1, Timer 2 of IC 8253 #0 is actuated. The resulting signal is a short pulse signal having a time period of one unit.

(4) QH and $\overline{QH}$ (Output pins of IC 74165)

If the morse code representation of the character consists of less than six pulse signals, PA7 PA6 and PA5 of the EMC are received by pins CBA of IC 74190. PA4 PA3 PA2 PA1 and PA0 of the EMC are received by pins DEFGH of IC 74165 (CBA=000).

If there are six pulse signals, PA7 PA6 and PA5 =110. PC5 PA4 PA3 PA2 PA1 PA0 represent the six pulse signals of the morse code (BA=0).

When the clock input to IC 74165 changes from zero (0) to one (1), IC 74165 shifts by one unit and the contents of IC 74190 is decreased by one unit. A QH =1 output signifies a long pulse signal. A $\overline{QH}$ =1 output signifies a short pulse signal. When the contents of IC 74190 reaches 000, transmission of the EMC of the character has been achieved and the MX/MI pin of IC 74190 goes high. Timer 0 of IC 8253 #0 inserts a three unit space to indicate end of transmission of the character.

(5) OUT1 of IC 8253 #0

OUT1 of IC 8253 #0 is a normally high pin which goes low for a preset time period, such as 60 ms, when GATE1 of IC 8253 #0 detects a zero (0) to one (1) transition. OUT1 is used to supply the long pulse signal.

(6) OUT2 of IC 8253 #0

OUT2 of IC 8253 #0 is a normally high pin which goes low for a preset time period, such as 20 ms, when GATE2 of IC 8253 #0 detects a zero (0) to one (1) transition. OUT2 is used to supply the short pulse signal. The short pulse signal has a time period which is one-third of the time period of the long pulse signal.

(7) OUT0 of IC 8253 #1

OUT0 of IC 8253 ·1 is a normally high pin which does low for a preset time period, such as 20 ms, when GATE0 of IC 8253 #1 detects a zero (0) to one (1) transition. OUT0 is used to supply a one unit (20 ms) space between two consecutive pulse signals.

(8) OUT0 of IC 8253 #0

OUT0 of IC 8253 #0 is a normally high pin which goes low for a preset time period, such as 60 ms, when GATE0 of IC 8253 #0 detects a zero (0) to one (1) transition. OUT0 is used to supply a three unit (60 ms) space at the end of each transmitted character.

(9) Output of NAND (1)

The inputs to NAND (1) are OUT1 and OUT2 of IC 8253 #0. The resulting output signal of NAND (1) serves as an input to a modulator of the wireless radio unit 12 for eventual transmission to a remote receiver.

(10) $\overline{INT1}$ $\overline{INT1}$ is a normally high pin. Whenever the OUT0 pin of IC 8253#0 changes from zero (0) to one (1), the Q pin of IC 7474 (1) goes high and $\overline{INT1}$ =0. The change of $\overline{INT1}$ from a high state to a low logic state is detected by IC 8751 which responds by sending out a new EMC.

Using the letter "N" (- .) as an example, the following is the operation of the transmitter processing unit 4 of the preferred embodiment:

1. PA7 PA6 PA5 =010, PA4 PA3 PA2 PA1 PA0 =00001
2. PC0 changes from zero (0) to one (1).
3. The clock of IC 74165 goes from one (1) to zero (0) (no operation) and the clock of IC 74190 goes from one (1) to zero (0) (no operation).
4. The output of NAND (3) changes from one (1) to zero (0). Pin QH of IC 74165 =1. GATE1 of IC 8253#0 goes low for a period of 60 ms. The output of NAND (1) is a pulse having a length of 60 ms and representing a long pulse signal.
5. The zero (0) to one (1) transition at the output of NAND (1) is detected at the GATE0 of IC 8253 #1. The OUT0 pin of IC 8253 #1 undergoes a one (1) to zero (0) transition for a period of 20 ms, which is used as a unit of space between two pulse signals. The clock input to IC 74165 goes from zero (0) to one (1). The contents of IC 74165 is shifted one unit to the right. The clock input to IC 74190 similarly goes from zero (0) to one (1). The content of IC 74190 is decreased by one unit.
6. After the insertion of the one unit space, OUT0 of IC 8253 #1 goes from zero (0) to one (1). The clock inputs to ICs 74190 and 74165 go from one (1) to zero (0). The output of NAND (3) changes from zero (0) to one (1). Pin $\overline{QH}$ of IC 74165 =1. GATE2 of IC 8253 #0 receives a high signal from AND (3). OUT2 of IC 8253 #0 goes low for a period of 20 ms. The output at NAND (1) is a pulse having a length of 20 ms and representing a short pulse signal.

7. When the output of NAND (1) changes from one (1) to zero (0), a high level signal is received at GATE0 of IC 8253 #1. OUT0 of IC 8253 #1 goes low. The clock inputs to ICs 74190 and 74165 go from zero (0) to one (1). The contents of IC 74190 is further decreased by one unit. The contents of IC 74190 at this stage = 0000B and MX/Mi =1. GATE0 of IC 8253 #0 goes from one (1) to zero (0) for a period of 60 ms, which represents a three unit space between characters. The output of AND (1) goes low, thus negating the effect of the OUT0 of IC 8253 #1 on the clock inputs of ICs 74190 and 74165 when OUT0 of IC 8253 #1 goes high.

8. After the insertion the three unit space, OUT0 of IC 8253 #1 goes from zero (0) to one (1). Pin Q of IC 7474 (1) goes high and $\overline{INT1}$ =0.

9. The low state of $\overline{INT1}$ is detected by IC 8751, informing it that transmission of the character has been achieved. PC2 goes from one (1) to zero (0) to reset IC 7474 (1). Another EMC is thus sent out by IC 8751.

Figure 15:
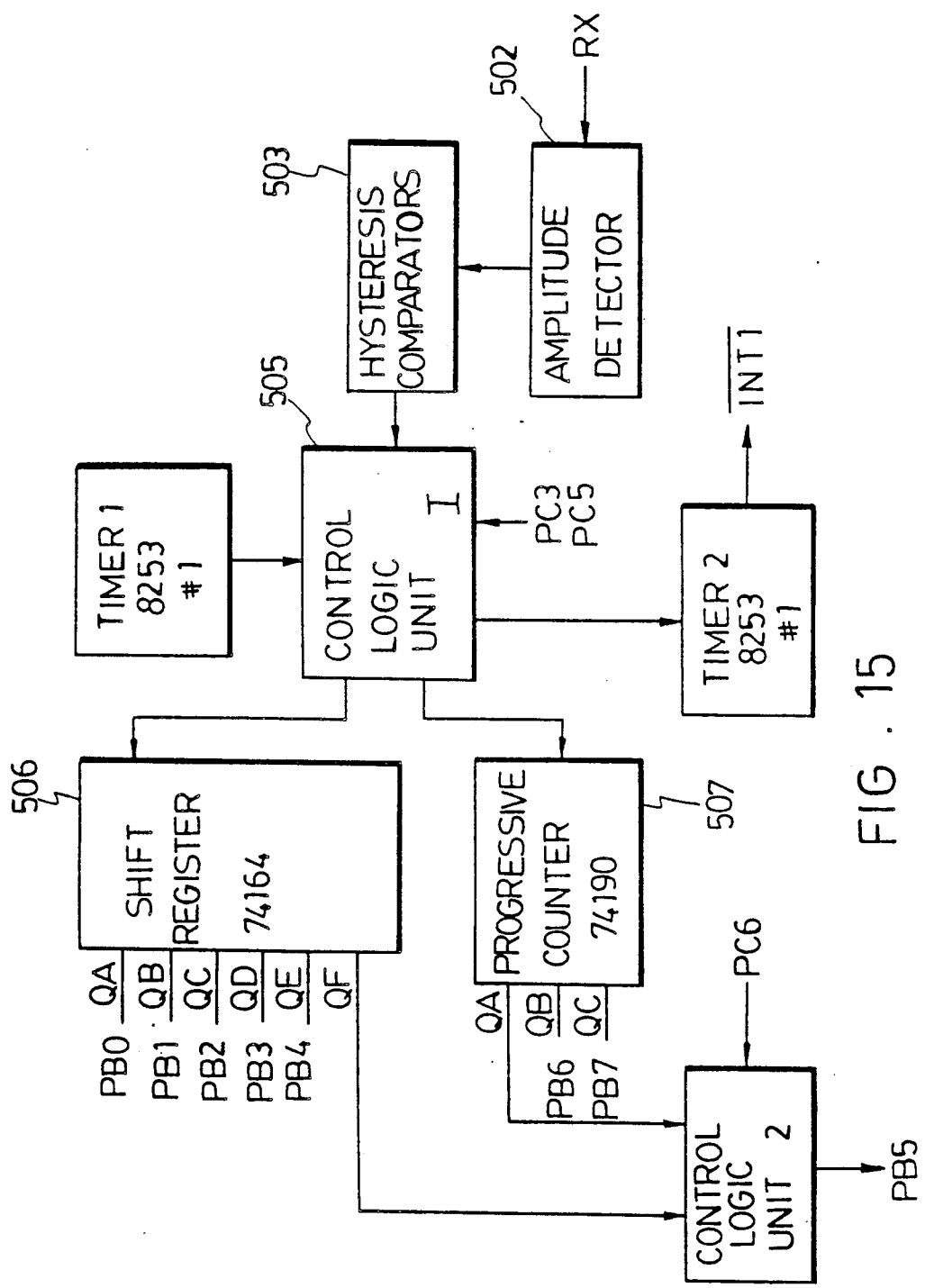
FIG. 15 is a circuit block diagram of the receiver processing unit of the preferred embodiment.

Referring to the block diagram of the receiver processing unit 5 of FIG. 15 in combination with the schematic circuit diagrams of FIGS. 13A, 13B, 13C and 13D, the received morse code signals of a character is first demodulated and passes through an amplitude detector 502. The demodulated signal has a sub-carrier frequency in the range of 800 Hz to 1.2 kHz (suggested sub-carrier frequency is 1 kHz). The amplitude detected signal serves as input to a pair of cascaded hysteresis comparators 503 (IC LM 311) which filters out the amplitude detected signal. The output of the hysteresis comparators 503 are logic levels one (1) or zero (0). When the output of the hysteresis comparators 503 is a logic one, Timer 1 of IC 8253 #1 sends out a clock signal having a frequency of 5.38 kHz to IC 74393 of the control logic unit 505.

If the output of the hysteresis comparators 503 is a pulse having a length of 6 ms or lower, the pulse signal is considered an extraneous noise signal. The Q pins of ICs 74107 (1) and (2) remain in a low state. Both the shift register 506 (IC 74164) and the up counter 507 are not yet in operation at this stage.

If the output of the hysteresis comparators 503 is a pulse having a length between 6 ms and 24 ms, the pulse is considered a short pulse signal. The Q pin of IC 74107 (2) goes to a high state at the start of the sixth ms and the content of the shift register 506 is shifted one unit to the left. The content of the up counter 507 is increased by one unit. A zero (0) is placed as the least significant bit in the shift register 506. The state of the Q pin of IC 74107 (1) is unchanged.

If the output of the hysteresis comparators 503 is a pulse having a length greater than 24 ms, the pulse is considered as a long pulse signal. The Q pin of IC 74107 (2) goes to a high state at the start of the sixth ms and the contents of the shift register 506 is similarly shifted by one unit to the left. The contents of the up counter 506 is increased by one unit. A one (1) is placed as the least significant bit in the shift register 506.

Therefore, a one (1) at the Q pin of IC 74107 (2) indicates that a valid pulse signal was received. Under this condition, a zero (0) at the Q pin of IC 74107 (1) indicates that the pulse is a short pulse signal and a one (1) at the same Q pin indicates that the pulse is a long pulse signal.

The clock inputs of the shift register 506 and the up counter 507 are controlled by IC 74107 (2). Thus, a zero (0) to one (1) transition of the clock input shifts the contents of the shift register 506 one unit to the left and adds an increment of one unit to the contents of the up counter 507. Pin AB of the shift register 506 is connected to the Q pin of IC 74107 (1). The voltage level at pin AB serves as the least significant bit input for the shift register 506. Pins QC QB QA of the up counter 507 represent the number of pulse signals which comprise the character received. Pins QF QE QD QC QB QA of the shift register 506 describe the sequence of the signals and the length of each one. The pins QC QB of the up counter 507 and the pins QE QD QC QB QA of the shift register 506 serve as input to PORT B of IC 8255. If there are less than six pulse signals received, QA of the up counter 507 is sent to pin PB5 of PORT B of IC 8255. If there are six pulse signals received, QF of the shift register 506 is sent to pin PB5 of PORT B of IC 8255. The contents of PORT B is the EMC of the character received.

Figure 16:
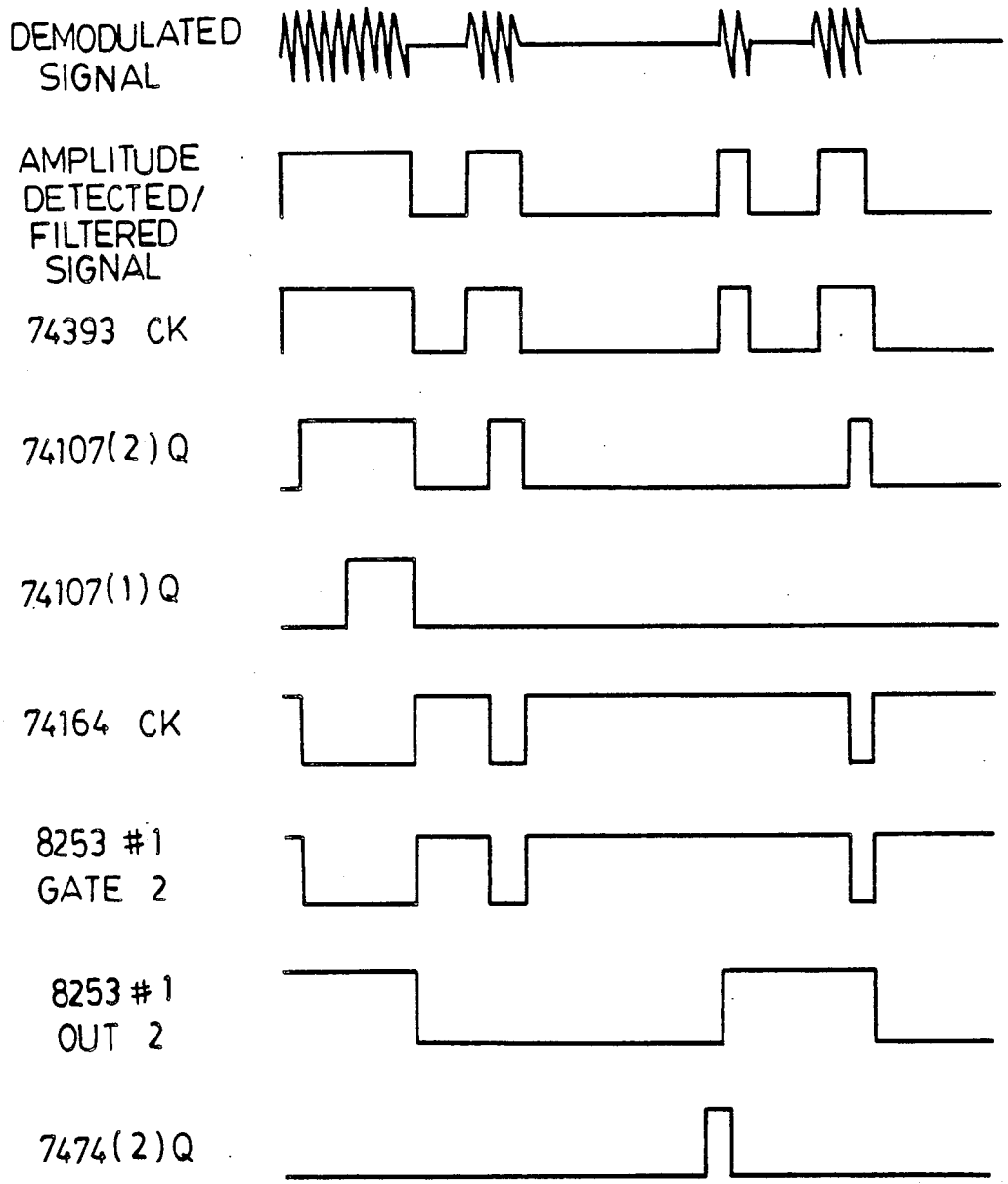
FIG. 16 is a timing diagram illustrating the operation of the receiver processing unit.

Referring to FIGS. 13A, 13B, 13C, 13D, and 15 and to the timing diagram of FIG. 16, the following is a description of the operation of the receiver processing unit 5 of the preferred embodiment:

1. Six milliseconds after the start of the first pulse, the Q pin of IC 74107 (2) undergoes a zero (0) to one (1) transition, indicating that the first pulse is a valid signal. Twenty-four milliseconds after the start of the first pulse, the Q pin of IC 74107 (1) undergoes a zero (0) to one (1) transition and GATE2 of IC 8253 #1 undergoes a one (1) to zero (0) transition. This indicates that the first pulse is a long pulse signal. OUT2 of IC 8253 #1 is a normally high pin that does not undergo a change of state at this time. At the end of the first pulse signal, the clock inputs of ICs 74190 and 74164 undergo a zero (0) to one (1) transition. QA of IC 74164 becomes 1, and the content of the up counter 507 is increased by one unit. GATE2 of IC 8253 #1 undergoes a zero (0) to one (1) transition and OUT2 of the same changes from one (1) to zero (0).

2. Six milliseconds after the start of the second pulse signal, the Q pin of IC 74107 (2) undergoes a zero (0) to one (1) transition, indicating that the second pulse is a valid signal. No change of state occurs at the Q pin of IC 74107 (1), indicating that the signal is a short pulse signal. The GATE2 of IC 8253 #1 undergoes a one (1) to zero (0) transition, no change occurs at OUT2 of IC 8253 #1. At the ned of the second pulse signal, the clock inputs of ICs 74190 and 74164 undergo a zero (0) to one (1) transition. QA of IC 74164 becomes 0, QB of IC 74164 becomes 1, and the content of the up counter 507 is increased by another unit. GATE2 of IC 8253 #1 undergoes a zero (0) to one (1) transition. Still no change occurs at OUT2 of IC 8253 #1 at this time. Fifty milliseconds after the transmission of the short pulse signal (equivalent to 2.5 units of space), OUT2 of IC 8253 #1 changes from zero (0) to one (1), thus triggering IC 7474 (2). Pin Q of IC 7474 (2) goes high and $\overline{INT1}$ =0. This serves as an indication to IC 8751 that conversion of the received morse code has been completed and PC3 goes from one (1) to zero (0) to reset IC 7474 (2). IC 8751 receives an EMC of 01000010 or 42H.

3. The third pulse is an extraneous noise signal having a length of 6 ms. The Q pin of IC 74107 (2) does not undergo any change in transition state since the third pulse does not have a length greater than 6 ms. Thus, even though there is a clock input to IC 74393, ICs 74164, 74190 and Timer 2 of IC 8253 #1 are not in operation.

4. The fourth pulse has a width of 10 ms. Six milliseconds after the start of the fourth pulse, pin Q of IC 74107 (2) undergoes a zero (0) to one (1) transition. NO change of state occurs at the Q pin of IC 74107 (1). The clock inputs of ICs 74190 and 74164 undergo a zero (0) to one (1) transition. QA of IC 74164 becomes 0, and the content of the up counter 507 is increased by another unit. This example illustrates the external noise rejection feature of the system.

Figure 17:
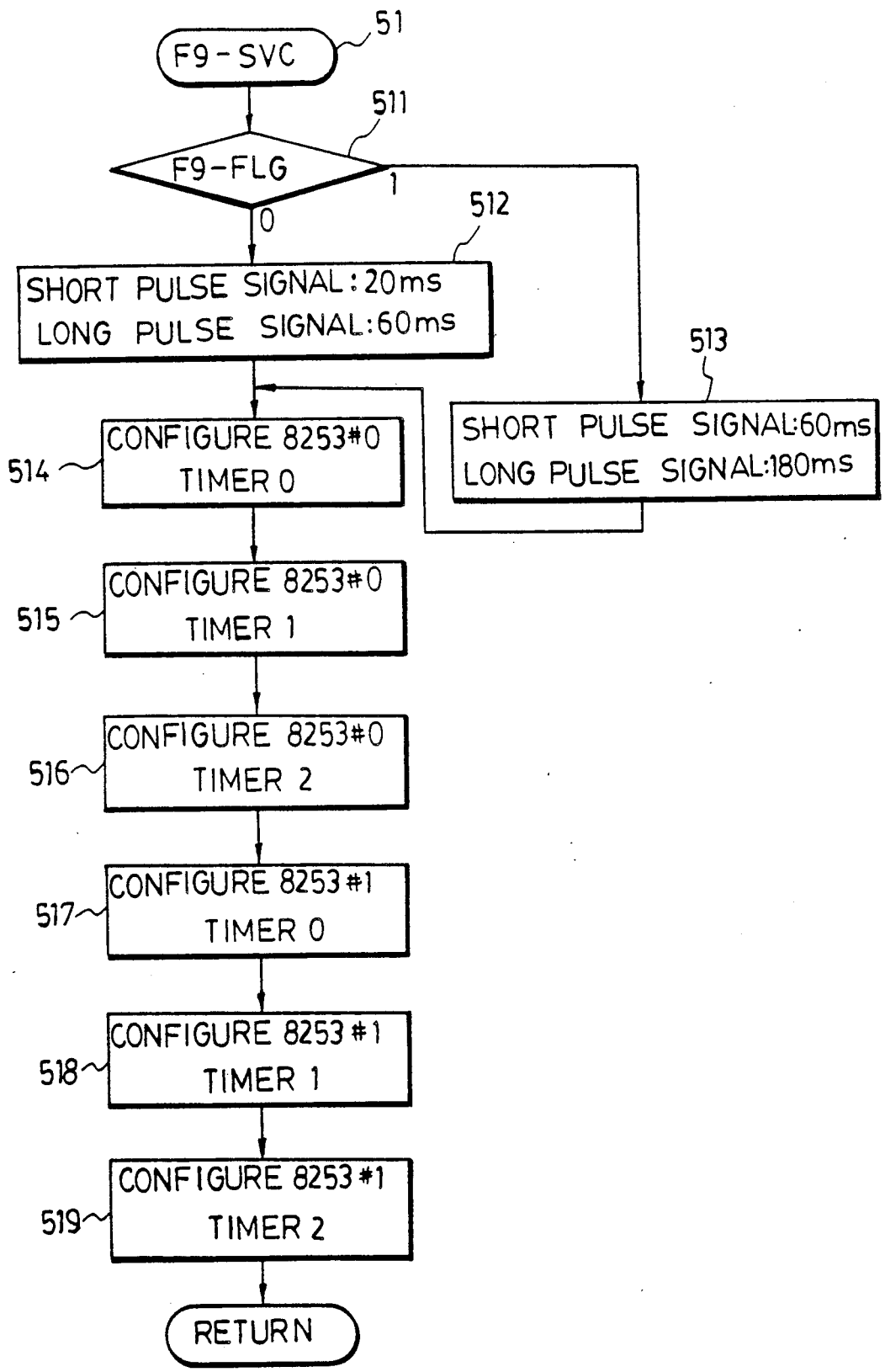
FIG. 17 is a flowchart of a transmission/reception speed adjustment subroutine of the microprocessor unit.

FIG. 17 is a flowchart of the F9-SVC subroutine 51. F9-SVC 51 first tests the state of F9-FLG (instruction 511). If F9-FLG =0, the duration of one short pulse signal is set to 20 ms and the duration of one long pulse signal is set to 60 ms (instruction 512). This mode is used if reception is to be done with the use of the computer 70. If F9-FLG =1, the duration of one short pulse signal is set to 60 ms, and the duration period of one long pulse signal is set to 180 ms (instruction 513). This mode is used if decoding is to be done manually, by discerning audible signals. The Timers 0, 1 and 2 of IC 8253 #0, and Timers 0, 1 and 2 of IC 8253 #1 are consequently configured according to the state of the F9-FLG (instructions 514 to 519). The ESC key is pressed to reset the F9-FLG from one (1) to zero (0).

Figure 18A:
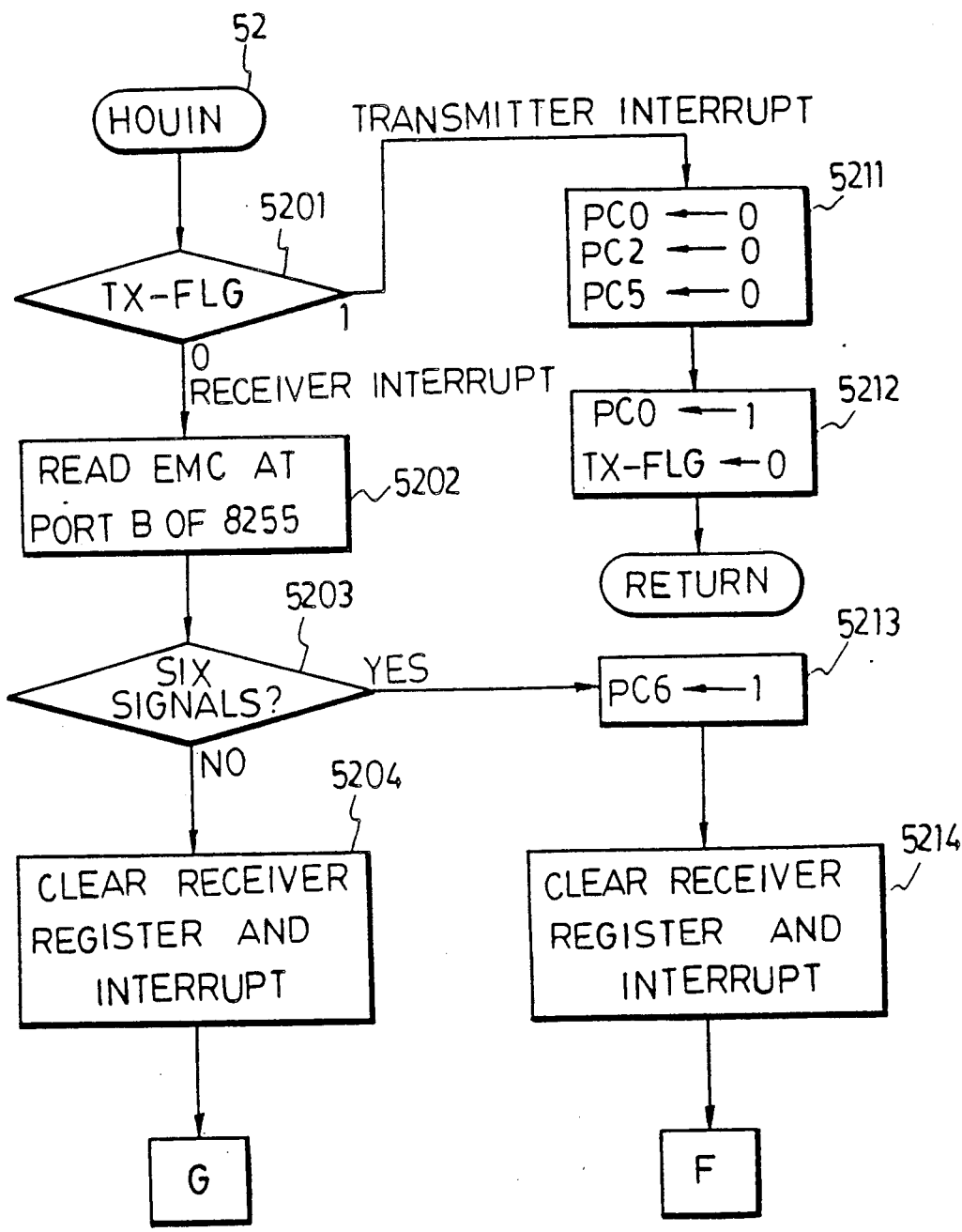
FIGS. 18A and 18B are flowcharts of a transmission/reception interrupt subroutine of the microprocessor unit.
Figure 18B:
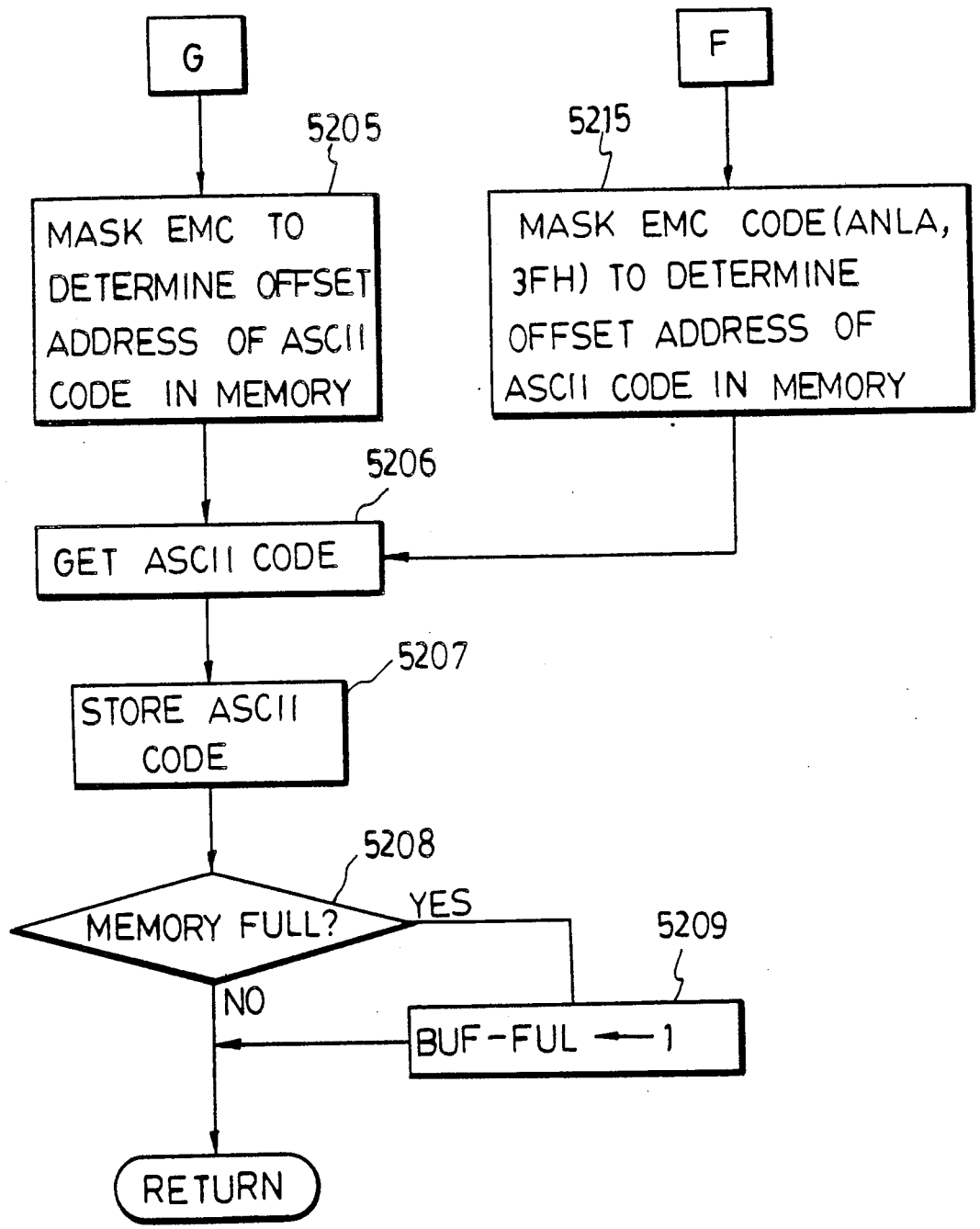

The flowchart of the HOUIN subroutine 52 is shown in FIGS. 18A and 18B. HOUIN 52 is executed whenever $\overline{INT1}$ =0. HOUIN 52 first tests the state of the TX-FLG 2101 (instruction 5201). If TX-FLG =1, a transmitter interrupt is generated. PC0, PC2 and PC5 are all set to zero (0) (instruction 5211). PC0 is then set to one (1) and the TX-FLG 2101 is set to zero (0) (instruction 5212). The subroutine 52 goes back to the main program. If TX-FLG 2101 =0, a receiver interrupt is generated. The received EMC is read from PORT B of IC 8255 (instruction 5202). The received EMC is then tested to determine if the number of pulse signals which comprises the received character is equal to six (instruction 5203). If the number of pulse signals is not equal to six, the receiver register is cleared and the receiver interrupt is reset (instruction 5204). The EMC is then masked to determine the number of pulse signals received and the offset address of the corresponding ASCII code in the memory unit 22 (instruction 5205). If the number of signals is equal to six, PC6 is set to one (1) to indicate that there are six pulse signals received (instruction 5213). The receiver register is then cleared and the receiver interrupt is reset (instruction 5214). The EMC is masked to obtain a six bit data code that is used to determine the offset address of the corresponding ASCII code (instruction 5215). The ASCII code is then obtained (instruction 5206) and stored in the receiver register 22 (instruction 5207). The receiver register 22 is tested to see if it is full (instruction 5208). A Buffer-Full flag is set to one (1) if the receiver register 22 is full (instruction 5209). The subroutine 52 returns to the main program afterwards.

Eight 5×7 dot matrix displays comprise the hardware of the display unit 6. Since the construction of dot matrix displays is well known to one skilled in the art, it will not be detailed herein.

Figure 19:
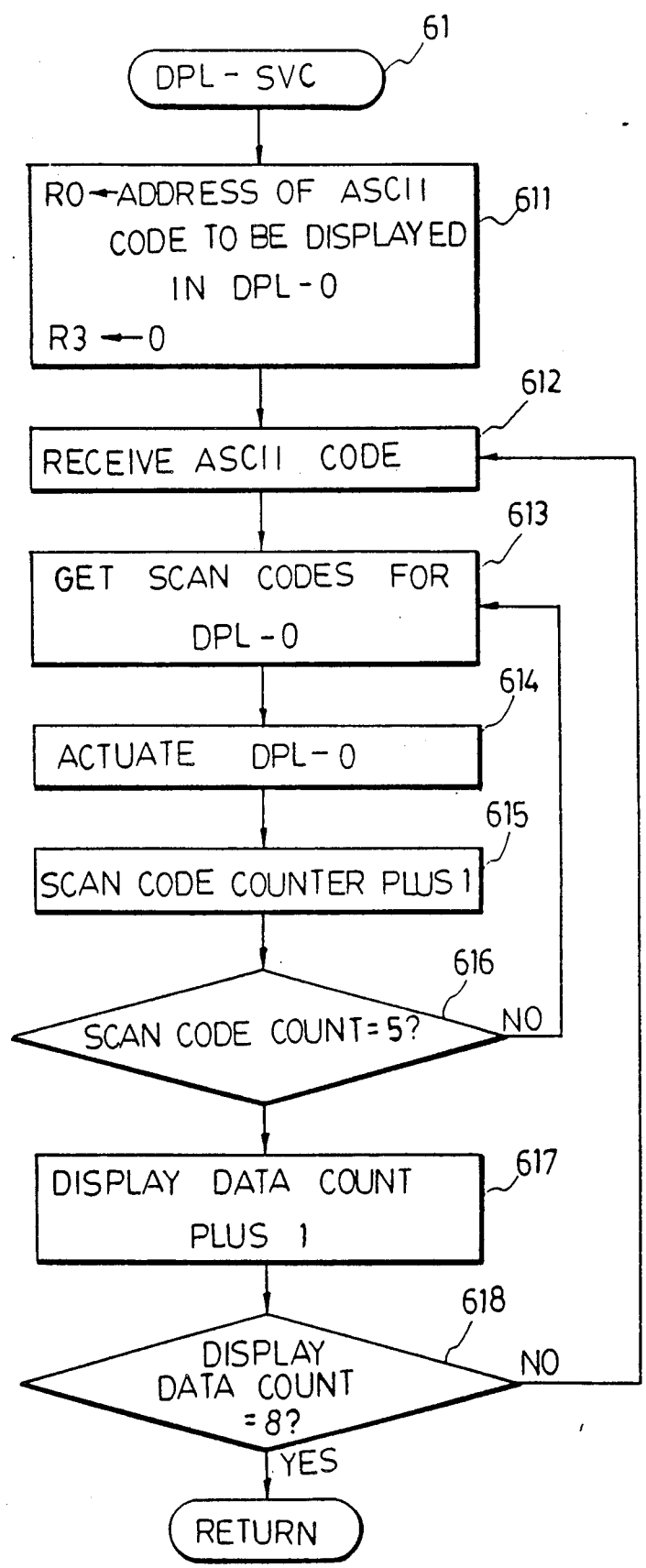
FIG. 19 is a flowchart of a display unit service subroutine of the microprocessor unit.

FIG. 19 is a flowchart of the DPL-SVC subroutine 61. Whenever the DPL-SVC 61 subroutine is executed during a pooling cycle of the main program, the address of the ASCII code to be displayed in one of the dot matrix displays (DPL-0 to DPL-7) is stored in the register R0 and a zero (0) is stored in the register R3 of IC 8751 (instruction 611). Register R3 contains data on which unit is to be scanned and should thus be initially set to zero (0). Once the ASCII code to be displayed has been received (instruction 612), the five scan codes corresponding to the ASCII code are to be obtained from a look-up table (instruction 613) and are used to actuate one of the dot matrix displays (instruction 614). A scan code counter is incremented by one (instruction 615) and the subroutine 61 then checks if all five scan codes have been obtained (instruction 616). If less than five scan codes have been obtained, instruction 613 is repeated. Once five scan codes have been obtained, a display data count is incremented by one (instruction 617). The display data count is then tested to see if it is equal to eight (instruction 618). If the display data count is less than eight, instruction 612 is repeated, so a new ASCII code is received. If the display data count is equal to eight, DPL-SVC 61 returns to the main program.

The data shown on the display unit 6 may be:
1. Data input from the keyboard 30.
2. Data received by the RS-232 interface adapter 70.
3. Data received by the wireless radio unit 12.

The SHIFT-LEFT 62 subroutine is executed by pressing the +key. Once initiated, a new character is received by DPL-0 and the character formerly displayed in DPL-0 is now displayed by DPL-1. The character formerly displayed by DLP-1 is now displayed by DLP-2. The character formerly displayed by DLP-2 is now displayed by DPL-3. The character formerly displayed by DLP-3 is now displayed by DPL-4. The character formerly displayed by DPL-4 is now displayed by DPL-5. The character formerly displayed by DPL-5 is now displayed by DPL-6. And finally, the character formerly displayed by DPL-6 is now displayed by DPL-7.

The SHIFT-RIGHT 63 subroutine is executed by pressing the—key. Once initiated, a new character is received by DPL-7 and the character formerly displayed in DPL-7 is now displayed by DPL-6. The character formerly displayed by DPL-6 is now displayed by DPL-5. The character formerly displayed by DPL-5 is now displayed by DLP-4. The character formerly displayed by DPL-4 is now displayed by DPL-3. The character formerly displayed by DLP-3 is now displayed by DPL-2. The character formerly displayed by DPL-2 is now displayed by DPL-1. And finally, the character formerly displayed by DPL-1 is now displayed by DPL-0.

The SHIFT-RIGHT 62 and SHIFT-LEFT 63 subroutines are executed whenever a new character is to be displayed on the display unit 6.

Figure 20:
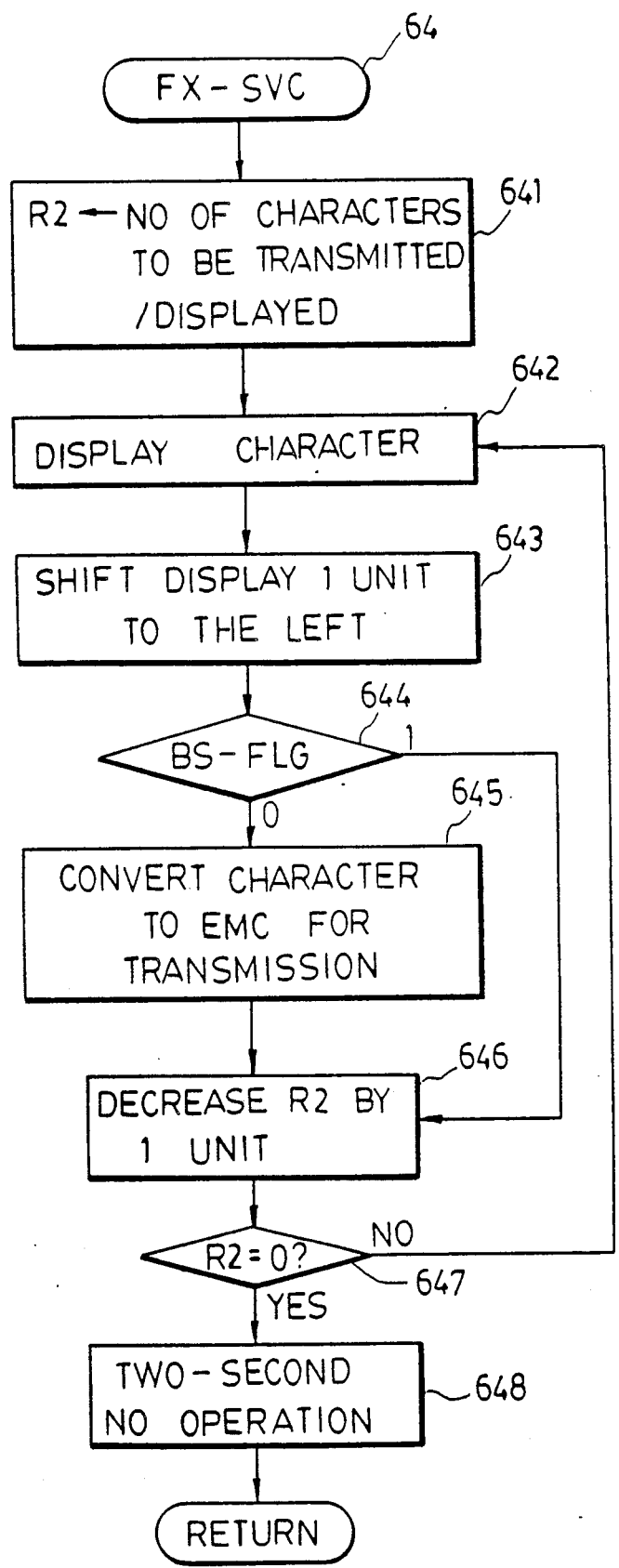
FIG. 20 is a flowchart of a function key service subroutine of the microprocessor unit.

FIG. 20 is a flowchart of the FX-SVC 64 subroutine. FX-SVC 64 first stores the number of characters to be transmitted or displayed into the register R2 of IC 8751 (instruction 641). Once the first character has been displayed (instruction 642), the content of the display unit 6 is shifted one unit to the left (instruction 643). The BS-FLG 2118 is then tested to see if it is equal to one (instruction 644). If BS-FLG 2118 =1, the contents of register R2 is decreased by one (instruction 646). If BS-FLG 2118 =0, the character is converted into the EMC for eventual transmission by the wireless radio unit 12 (instruction 645). The content of register R2 is then decreased by one (instruction 646). The FX-SVC 64 subroutine then tests whether the content of register R2 is equal to 0 (instruction 647). If R2 =0, a two second no operation instruction is performed (instruction 648) and the subroutine 64 returns to the main program.

One of the following strings is transmitted by the wireless radio unit 12 when the FX-SVC 64 subroutine is executed:
(1) H0001-SOS : Transmitted when the F2 key is pressed.
(2) REPEAT : Transmitted when the F3 key is pressed.
(3) --HXXX-- : Transmitted when the F4 key is pressed.
(4) KD??????: Transmitted when the F5 key is pressed.
(5) RECEIVED : Transmitted when the F8 key is pressed.
(6) TX-ERROR : Transmitted when the F9 key is pressed.
(7) RX-HOME : Transmitted when the BS key is pressed.

Prior to the operation of the FX-SVC 64 subroutine, the data pointer (DPTR) is first set to the starting address of the string to be transmitted/displayed.

When the wireless radio unit 12 receives an EMC, the EMC is converted into ASCII and stored in the memory unit 22 at addresses 2000H—3FB0H. The character corresponding to the ASCII code is then shown on the display unit 6. The UP-SVC 65, DN-SVC 66, MINU-SVC 67 and PLUS-SVC 68 subroutines are used to change the location of the display pointer on the memory unit 22.

When the PgUp key is pressed, the UP-SVC 65 subroutine (a flowchart of which is shown in FIG. 21) is executed. The display pointer is moved to the starting address (2000H) of the memory unit 22 and the data found in this address is displayed at DPL-0.

Figure 22:
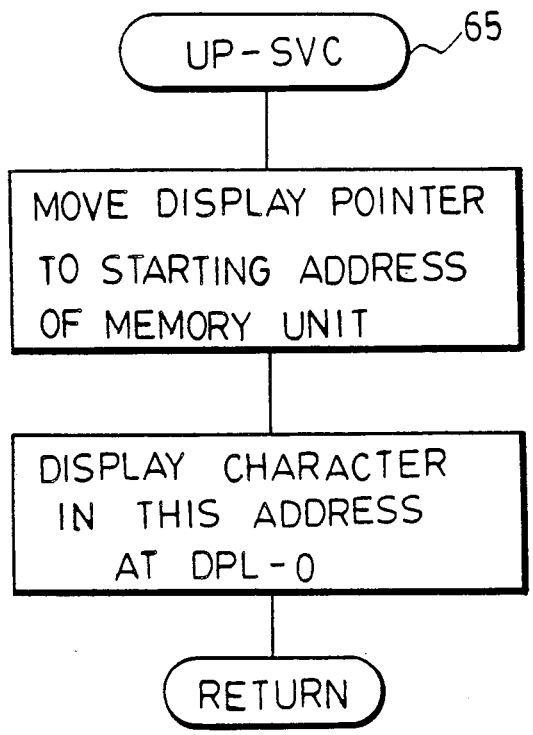
Figure 22:
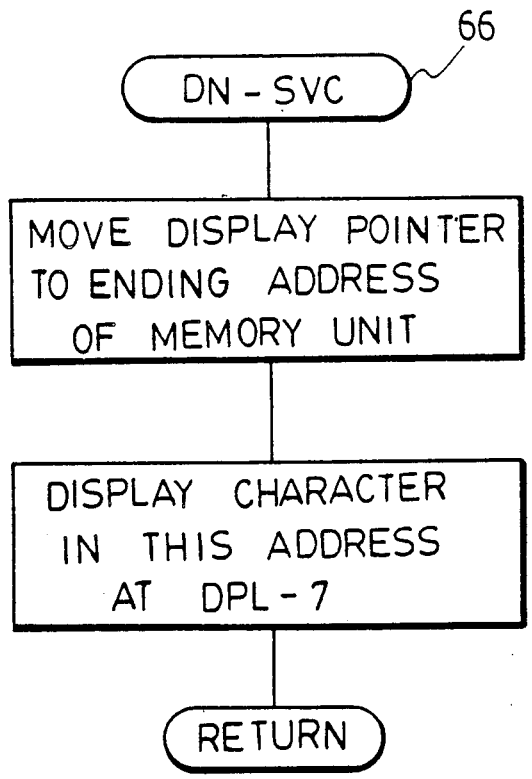

When the PgDn key is pressed, the DN-SVC 66 subroutine (a flowchart of which is shown in FIG. 22) is executed. The display pointer is moved to the ending address (3FB0H) of the memory unit 22 and the data found in this address is displayed at DPL-7.

When the "—" key is pressed, the MIN-SVC 67 subroutine is executed. The display pointer moves backward by 1 unit, thus shifting the contents of the display register one space to the right. If the display pointer is located at address 2000H when the subroutine 67 is executed, no operation is performed.

When the "+" key is pressed, the PLUS-SVC 68 subroutine is executed. The display pointer moves forward by one unit, thus shifting the contents of the display register one space to the left. (ENPTIH) is the high byte of the address of the final data received and stored in the memory unit 22. (ENPTIL) is the low byte of the address of the final data received and stored in the memory unit 22. If the display pointer is located at address (ENPTIH) (ENPTIL) when the subroutine 68 is executed, no operation is done and the subroutine 68 returns to the main program.

Figure 23:
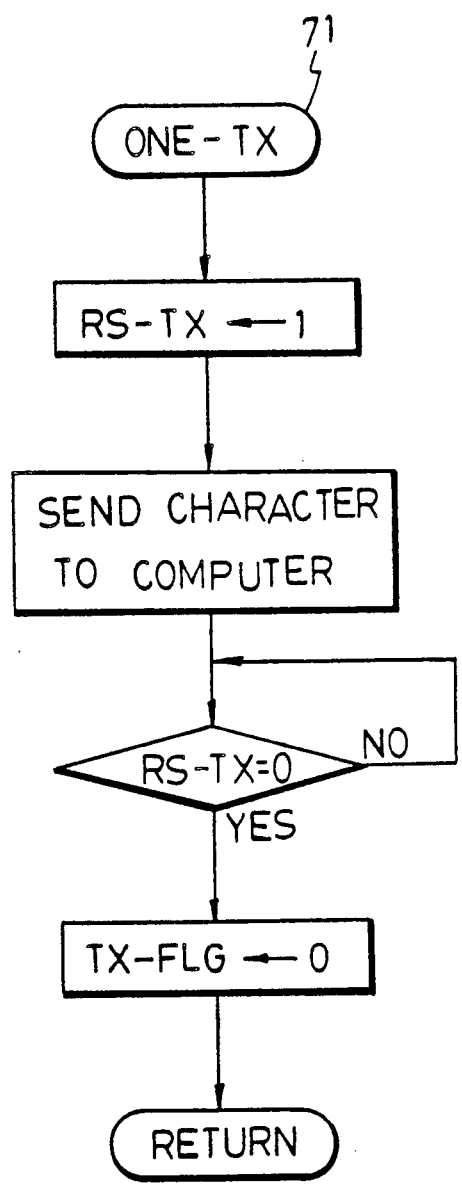
FIGS. 23 and 24 are flowcharts of computer transmission subroutines of the microprocessor unit.

FIG. 23 is a flowchart of the ONE-TX 71 subroutine. The TX-FLG 2101 is at a high level when ONE-TX 71 is executed. An RS-TX flag is set to one (1) in order to generate an interrupt signal for the RS-232 interface adapter 7. The ASCII code of a character stored in the memory unit 22 is then sent to the computer 70. At the end of transmission, RS-TX becomes zero (0) and the TX-FLG 2101 is set to zero (0). The subroutine 71 returns to the main program.

Figure 24:
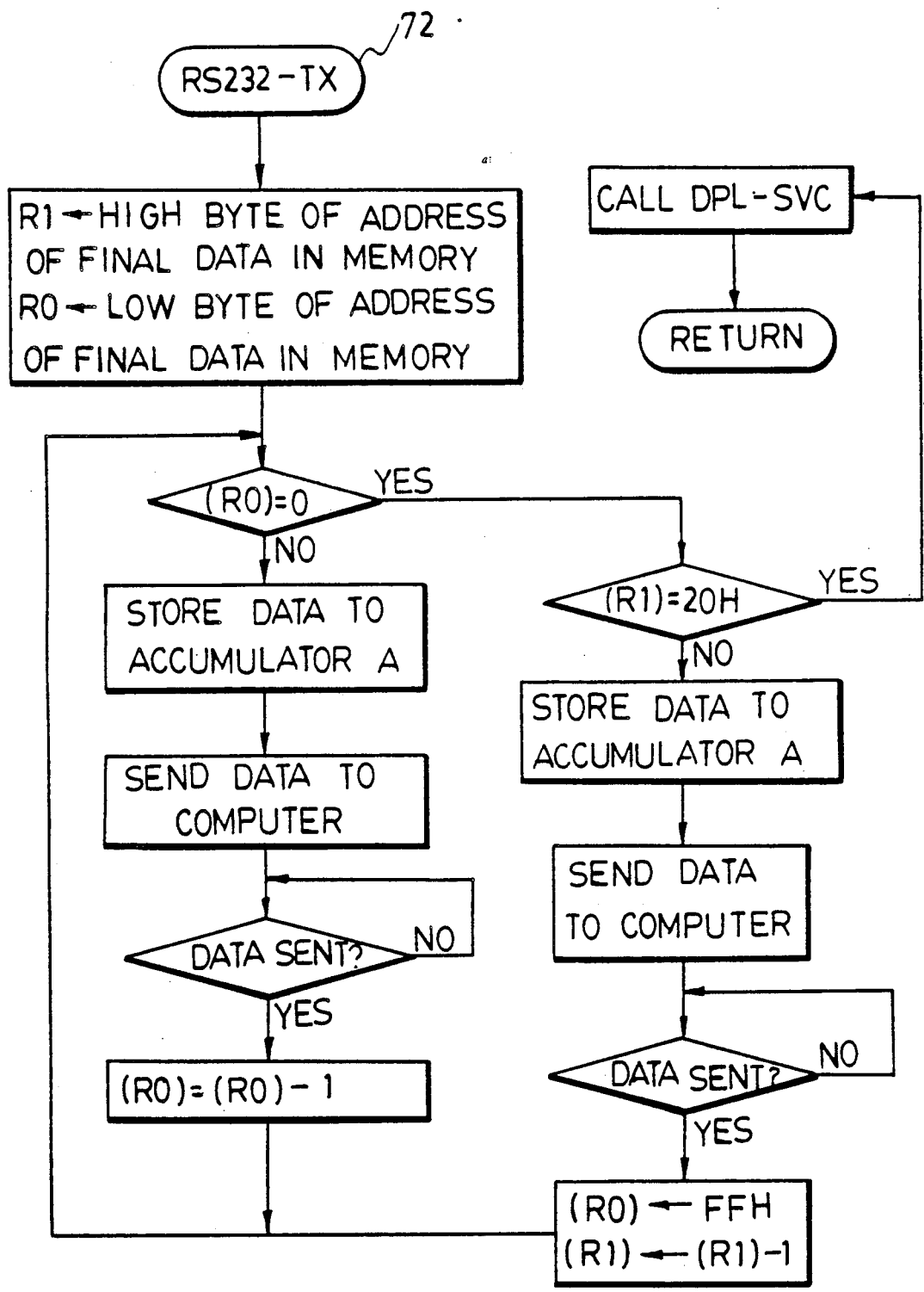

FIG. 24 is a flowchart representing the RS232-TX 72 subroutine. RS232-TX 72 is executed by pressing the F1 key (F1-FLG 2104) after the corresponding ASCII code of the received EMC is stored in the memory unit 22. The data stored in the memory unit 22 is then transmitted to the computer 70 through the RS-232 interface adapter 7 for eventual display in the computer monitor.

When RS232-TX 72 is executed, the high and low bytes of the address of the final data stored in the memory unit 22 are respectively stored in the registers R1 and R0. The contents of registers R1 and R0 are then tested to see if they are equal to 20H and 00H, respectively. If the contents of registers R1 and R0 are equal to 20H and 00H, the DPL-SVC 61 is executed. Otherwise, the data stored in that particular address is stored in the accumulator A of IC 8751 and is eventually transmitted to the computer 70. After transmission of the data, the address immediately preceding the final address is then tested to determine if it is equal to 2000H, and another transmitting cycle is accomplished.

Figure 25:
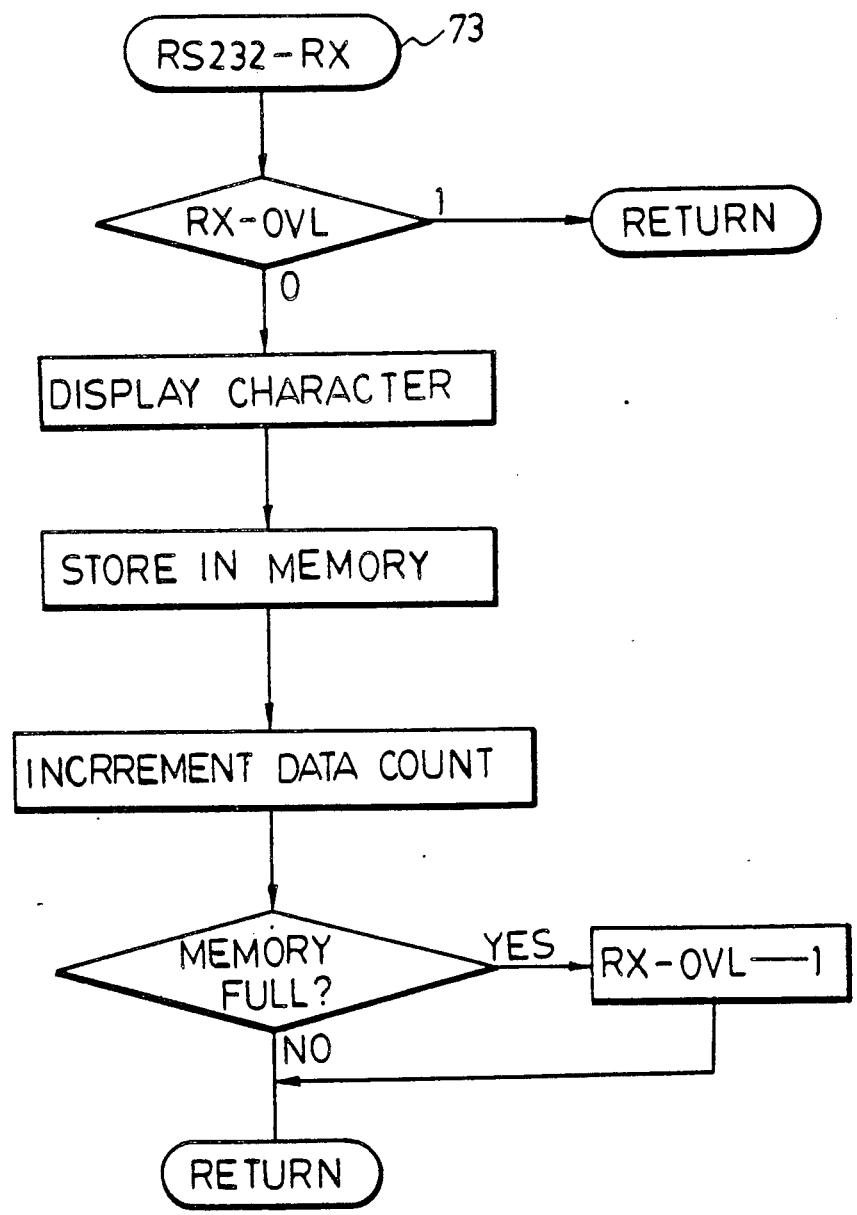
FIG. 25 is a flowchart of a computer reception subroutine of the microprocessor unit.

FIG. 25 is a flowchart of the RS232-RX 73 subroutine. RS232-RX 73 is executed by the KB-SVC 31 subroutine when it is desired to send data from the computer 70 to the transmitter processing unit 4 for eventual transmission by the wireless radio unit 12. Data from the computer 70 may be a character or a string and passes through the RS-232 interface adapter 70 for storage in the memory unit 22.

When the RS232-RX 73 subroutine is executed, an RX-OVL flag is first tested to find if it is equal to zero (0). The RX-OVL flag indicates the state of the memory unit 22. RX-OVL = 1 means that the memory unit 22 is full and cannot accept any more data from the computer 70. The subroutine 73 returns to the main program. If RX-OVL = 0, the character coming from the computer 70 is displayed on the display unit 6 and then stored in the memory unit 22. The data count is incremented by one unit and the memory unit 22 is then tested to see if it is full or not. If the memory unit 22 is full, the RX-OVL flag is set to one (1) and the subroutine 73 returns to the main program.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An extensive morse code processing system, comprising:
    means for supplying a first character encoded in a first binary form;
    means for generating a predetermined first line code corresponding to said first character; and
    means for converting said first line code into a series of long and short pulse signals corresponding to the morse code representation of said first character.

2. The extensive morse code processing system as claimed in claim 1, wherein said first line code generating means comprises:
    a microprocessor unit; and
    a memory means accessed by said microprocessor unit and containing a first look-up table to convert said binary encoded first character into said first line code.

3. The extensive morse code processing system as claimed in claim 2, wherein said first binary form is in ASCII.

4. The extensive morse code processing system as claimed in claim 3, wherein said first line code comprises a plurality of first control bits corresponding to the number of pulse signals which represent said first character in morse code, and a plurality of first data bits, each of said first data bits corresponding to one of the pulse signals which represent said first character in morse code, said first data bit being a logic one (1) if said corresponding pulse signal is a long pulse signal, said first data bit being a logic zero (0 if said corresponding pulse signal is a short pulse signal.

5. The extensive morse code processing system as claimed in claim 4, wherein said first line code converting means comprises:
   means for generating a short pulse signal;
   means for generating a long pulse signal;
   means for generating a space after each pulse signal generated;
   a shift register having a plurality of inputs to receive said first data bits and an output having a logic state corresponding to the logic state at one of said inputs;
   means for controlling said shift register to shift by one place for a number of times corresponding to the number of pulse signals which represent said first character in morse code; and
   a control logic means actuating said long pulse signal generating means when said output of said shift register is a logic one (1), said control logic means actuating said short pulse signal generating means when said output of said shift register is a logic zero (0), said control logic means actuating said space generating means at the end of each pulse signal generated.

6. The extensive morse code processing system as claimed in claim 5, wherein said shift register controlling means comprises a down counter having a plurality of inputs to receive said first control bits, the contents of said down counter being decreased by one unit every time said shift register shifts by one place.

7. The extensive morse code processing system as claimed in claim 5, wherein said long pulse signal has a duration of three units and said short pulse signal has a duration of one unit.

8. The extensive morse code processing system as claimed in claim 7, wherein one unit is equal to 20 milliseconds.

9. The extensive morse code processing system as claimed in claim 8, further comprising means for selectively adjusting the duration of one unit from 20 milliseconds to 60 milliseconds.

10. The extensive morse code processing system as claimed in claim 7, wherein said space generating means inserts a one unit space between two consecutive pulse signals of said first character and a three unit space after the final pulse signal of said first character.

11. The extensive morse code processing system as claimed in claim 10, wherein said first character is supplied by a standard computer keyboard, said extensive morse code processing system further comprising means for indicating to said microprocessor unit that said first character is to be supplied by said computer keyboard.

12. The extensive morse code processing system as claimed in claim 11, wherein said binary coded first character is stored by said microprocessor unit in said memory means.

13. The extensive morse code processing system as claimed in claim 10, further comprising:
   means for supplying a second character encoded in a series of short and long pulse signals corresponding to the morse code representation of said second character;
   means for converting said series of short and long pulse signals into a second line code; and
   means for converting said second line code into a second binary form.

14. The extensive morse code processing system as claimed in claim 13, wherein said pulse converting means comprises:
   means for assigning a logic state corresponding to the length of each pulse signal of said second character, a logic one (1) being assigned if said pulse signal is a long pulse signal, a logic zero (0) being assigned if said pulse signal is a short pulse signal;
   means for counting the number of pulse signals of said second character; and
   means for detecting a space having a length of about 2.5 units, said 2.5 units of space indicating that reception of said second character has been completed;
   said second line code comprising a plurality of second control bits corresponding to the number of pulse signals of said second character, and a plurality of second data bits corresponding to the length of each pulse signal of said second character.

15. The extensive morse code processing system as claimed in claim 14, wherein said second line code is received by said microprocessor unit, said memory means further having a second look-up table accessed by said microprocessor unit to convert said second line code into said second binary form.

16. The extensive morse code processing system as claimed in claim 15, wherein said second binary form is in ASCII.

17. The extensive morse code processing system as claimed in claim 13, further comprising a display means actuated by said microprocessor unit to selectively display either said first character or said second character.

18. The extensive morse code processing system as claimed in claim 17, wherein said display means is a 5×7 dot matrix display.

19. The extensive morse code processing system as claimed in claim 10, wherein said first character is supplied by a computer having an RS-232 interface adapter interconnected to said microprocessor unit, said extensive morse code processing system further comprising means for indicating to said microprocessor unit that said first character is to be supplied by said computer.

20. The extensive morse code processing system as claimed in claim 16, wherein said second binary form of said character is received by a computer having an RS-232 interface adapter interconnected to said microprocessor unit.

21. The extensive morse code processing system as claimed in claim 13, further comprising a radio means to wirelessly transmit said series of long and short pulse signals to a remote receiver and to supply said second character.

22. A method of making morse code conversions, comprising:
   supplying a first character encoded in a first binary form to a microprocessor unit;
   storing a first binary form to a first line code look up table in a memory device;

converting said first binary form into said first line code; and converting said first line code into a series of short and long pulse signals corresponding to the morse code representation of said first character.

23. The method as claimed in claim 22, further comprising the step of obtaining said first line code of said first character including:

assigning a plurality of first control bits to correspond to the number of pulse signals which represent said first character in morse code; and assigning a first data bit to each of the morse code signals of said first character, said first data bit being a logic 1 if the morse code signal is a long pulse signal, said first data bit being a logic 0 if the morse code signal is a short pulse signal.

24. The method as claimed in claim 23, wherein said step of converting said first line code into a series of short and long pulse signals corresponding to the morse code representation of said first character comprises:

providing a shift register means to receive each of said first data bits and having an output corresponding to one of said first data bits;

controlling said shift register means to shift by one place a number of times corresponding exactly to the number of pulse signals which represent said first character in morse code;

generating a long pulse signal if said output of said shift register means is a logic one (1);

generating a short pulse signal if said output of said shift register means is a logic zero (0); and generating a space at the end of each pulse signal generated.

25. The method as claimed in claim 24, further comprising:

supplying a second character encoded in a series of short and long pulse signals corresponding to the morse code representation of said second character;

storing a second binary form to a second line code look up table in said memory device;

converting said series of short and long pulse signals into said second line code; and converting said second line code into said second binary form.

26. The method as claimed in claim 25, wherein said step of converting said series of short and long pulse signals into said second line code comprising:

assigning of logic one (1) to one of a plurality of second data bits of said second line code corresponding to one long pulse signal of said second character;

assigning a logic zero (0) to one of said second data bits of said second line code corresponding to one short pulse signal of said second character;

counting the number of pulse signals of said second character; and detecting the presence of a predetermined length of space after every pulse signal, said predetermined length of space indicating that reception of said second character has been been completed.

27. The method as claimed in claim 26, further comprising the step of assigning the number of counted pulse signals to a plurality of second control bits of said second line code.

28. The method as claimed in claim 27, further comprising the step of using said second binary form to display said second character on a display unit.

* * * * *